US007979361B2

(12) United States Patent
Friesen et al.

(10) Patent No.: US 7,979,361 B2
(45) Date of Patent: Jul. 12, 2011

(54) COMPOSITION OF WEB SERVICES USING REPRESENTATIONS

(75) Inventors: Andreas Friesen, Steinfeld (DE); Jens Lemcke, Karlsruhe (DE)

(73) Assignee: SAP AG, Walldorf (DE)

( * ) Notice: Subject to any disclaimer, the term of this patent is extended or adjusted under 35 U.S.C. 154(b) by 984 days.

(21) Appl. No.: 11/849,203

(22) Filed: Aug. 31, 2007

(65) Prior Publication Data

US 2009/0063370 A1    Mar. 5, 2009

(51) Int. Cl.
G06G 7/00 (2006.01)
G06E 1/00 (2006.01)
G06E 3/00 (2006.01)
G06F 15/00 (2006.01)

(52) U.S. Cl. ........................................ 706/10
(58) Field of Classification Search ..................... 706/10
See application file for complete search history.

(56) References Cited

U.S. PATENT DOCUMENTS 7,720,778 B2 * 5/2010 Friesen et al. .................. 706/45
7,769,762 B2 * 8/2010 Lemcke et al. ................ 707/748
7,822,770 B2 * 10/2010 Lemcke et al. ................ 707/780

OTHER PUBLICATIONS

An Intention-Aware Interface for Services Access Enhancement, Chiung-Hon Leon Lee; Alan Liu; Sensor Networks, Ubiquitous, and Trustworthy Computing, 2006. IEEE International Conference on vol. 2 Digital Object Identifier: 10.1109/SUTC.2006.38 Publication Year: 2006 , pp. 52-57.*
The development of Automated Real-Time Narrative Summaries (ARNS) using natural language generation software for PORTS®, Bethem, T.; Burton, J.; OCEANS 2003. Proceedings vol. 1 Digital Object Identifier: 10.1109/OCEANS.2003.178536 Publication Year: 2003 , pp. 145-148 vol. 1.*
A Mechanism for Efficient Management of Changes in BPEL based Business Processes: An Algebraic Methodology, Jeewani A. Ginige; Uma Sirinivasan; Athula Ginige; e-Business Engineering, 2006. ICEBE '06. IEEE International Conference on Digital Object Identifier: 10.1109/ICEBE.2006.7 Publication Year: 2006 , pp. 171-178.*
Generalized Lempel-Ziv parsing scheme and its preliminary analysis of the average profile, Louchard, G.; Szpankowski, W.; Data Compression Conference, 1995. DCC '95. Proceedings Digital Object Identifier: 10.1109/DCC.1995.515516 Publication Year: 1995 , pp. 262-271.*
Milanovic, Nikola "Contract-based Web Service Composition", Dissertation zur Erlangung des akademischen Grades doctor ingenieur im Fach Informatik, (Mar. 7, 2006).

* cited by examiner

*Primary Examiner* — Michael Holmes
(74) *Attorney, Agent, or Firm* — Brake Hughes Bellerman LLP

(57) ABSTRACT

A system for composing Web services may include a goal determiner unit and a composer unit. The goal determiner unit may be configured to access a primary goal of final states of Web service representations. The composer unit may be configured to compute a set of transitions from initial states of the Web service representations to the primary goal, compute intermediate states of one or more Web service representations, and generate a copy rule of the set of transitions, the copy rule having a condition part that specifies the intermediate states and a portion of the final states of the primary goal and an activity part that includes assignments of input variables consumed by transitions from the intermediate states.

20 Claims, 30 Drawing Sheets $\text{Repository} := 2^{\text{ID} \times \text{WebService}}$ ID ... set of unique identifiers for Web service representations $\text{IN}^{wsId}, \text{OUT}^{wsId}$ ... sets of input and output variables of Web service representations $\text{Variable} := \{ (wsId, v) : wsId \in \text{ID}, v \in (\text{IN}^{wsId} \cup \text{OUT}^{wsId}) \}$ $\text{VarAss} := \{ ((wsId_1, o), (wsId_2, i)) : wsId_1, wsId_2 \in \text{ID},$
$\qquad wsId_1 \neq wsId_2, o \in \text{OUT}^{wsId_1}, i \in \text{IN}^{wsId_2} \}$ $\text{WebService} := \langle \text{IN}, \text{OUT}, S, s_{\text{init}}, S_{\text{suc}}, S_{\text{fail}}, ST \rangle$

| | | |
|---|---|---|
| IN, OUT ... | | sets of input and output variables |
| S ... | | set of states |
| $s_{\text{init}} \in$ | S | (initial state) |
| $S_{\text{fin}} :=$ | $S_{\text{suc}} \cup S_{\text{fail}}, S_{\text{suc}} \cap S_{\text{fail}} = \emptyset$ | (final states) |
| $S_{\text{suc}}, S_{\text{fail}} \subset$ | S | (un/successful, final states) |
| $ST =$ | $ST_{\text{in}} \cup ST_{\text{out}}$ | (state transition function) |
| $ST_{\text{in}} :$ | $S \times (2^{\text{IN}} \setminus \{\emptyset\}) \to S$ | (input state transitions) |
| $ST_{\text{out}} :$ | $S \times (2^{\text{OUT}} \setminus \{\emptyset\}) \to S$ | (output state transitions) |

$\text{varState} : \{ (wsID, v) \mapsto state : wsId \in \text{ID}, v \in (\text{IN}^{wsId} \cup \text{OUT}^{wsId}),$
$\qquad state \in \{ \text{undef, initialized, processed} \} \}$ $\text{CompGoal} := \langle \text{PrimGoal}, \text{RecGoal} \rangle$
$\text{PrimGoal} \subseteq \text{Goal}$ ... set of primary goals
$\text{RecGoal} \subseteq \text{Goal}$ ... set of recovery goals
$\text{Goal} := 2^{\{ wsId \mapsto wsState : wsId \in \text{ID}, wsState \in (S^{wsId}_{\text{fin}} \cup \{s^{wsId}_{\text{init}}\}) \}}$ $\text{WSState} := \{ wsId \mapsto wsState : wsId \in \text{ID}, wsState \in S^{wsId} \}$ $\text{CopyRule} := \langle S, A \rangle, \quad S \subseteq \text{WSState}, \quad A \subseteq \text{VarAss}$

Fig. 4A $$\text{Variant} := 2^{\{wsId \mapsto Transs:\ wsId \in ID.\ Transs \subseteq ST^{wsId}\}}$$

$$\text{PlState} := 2^{WSState \times \{IN, OUT, undef\}}$$

Fig. 4B

REACHCOMPGOAL($cg \in$ CompGoal, $A \subseteq$ VarAss) $\equiv$
   return *copyRules* in let
      $pgs$ = primaryGoals($cg$),
      $initialSs$ = { $wsId \mapsto s : wsId \in$ ids($pg$), $pg \in pgs$, $s = s_{init}^{wsId}$ }
      $allowedGoals$ = primaryGoals($cg$) $\cup$ recoveryGoals($cg$)
      $vnts = \bigcup_{goals \in allowedGoals}$ CALCVARIANTS($goals$) in
      (*fail*, *copyRules*) := REACHGOAL($vnts$, $pgs$, $initialSs$, $allowedGoals$, $A$)

CALCVARIANTS($g \in$ Goal) $\equiv$
   return *crossProduct* in seq
      forall ($wsId, s$) $\in g$ do paths($wsId$) := CALCPATHS($ST^{wsId}$, $s$)
      $crossProduct := \times_{wsId \in ids(g)}$ [ { $wsId$ } $\times$ paths($wsId$) ]

CALCPATHS($T \subseteq ST^{wsId}$, $s \in S^{wsId}$) $\equiv$
   step
      oldSumOfLengths := 0
      paths := { { ($s_{pre}$, $V$, $s_{post}$) $\in T : s_{post} = s$ } }
   step while calcSumOfLengths(paths) > oldSumOfLengths do
      oldSumOfLengths := calcSumOfLengths(paths)
      forall *path* $\in$ paths do
         step paths := paths \ { *path* }
         step do forall *rule* $\in$ { ($s_{pre}$, $V_1$, $s_{pre_{ex}}$) $\in T$ :
            ($s_{pre_{ex}}$, $V_2$, $s_{post_{ex}}$) $\in path$ }
         paths := paths $\cup$ { *path* $\cup$ *rule* }
   step result := paths
where
   calcSumOfLengths(paths) $\equiv$
      $|path_1| + |path_2| + \ldots + |path_{|paths|}|$
      $path_x \in$ paths, $x = 1 .. |$paths$|$

Fig. 5A

REACHGOAL($vnts \subseteq$ Variant, $mandatGoals \subseteq$ Goal, $ss \in$ SimState,
    $allowedGoals \subseteq$ Goal, $A \subseteq$ VarAss) $\equiv$ return ($fail, copyRules$) in
  if $mandatGoals = \emptyset$ then $fail :=$ false par $copyRules := \emptyset$
  else
    step $fail :=$ true par $copyRules := \emptyset$ par variantCopyRules $:= \emptyset$
    step do forall $goalVnt \in$ PICKVARIANTS($vnts, ss, mandatGoals$)
      step (regFail, regCopyRules) :=
        REACHVARIANT($goalVnt$, finState($goalVnt$), $A$)
      step if not regFail then
        step (altFail, altCopyRules) :=
          VERIFYING($vnts, goalVnt$, regCopyRules, $ss, allowedGoals, A$)
        step if not altFail then
          $fail :=$ false
          variantCopyRules := variantCopyRules
            $\cup$ { filterRules(regCopyRules, altCopyRules) }
    step if variantCopyRules $\neq \emptyset$ then
      choose $oneVariantCopyRules \in$ variantCopyRules
      $copyRules := oneVariantCopyRules$
  where
    filterRules($C_1, C_2$) := { $c : c_1 \in C_1, c_2 \in C_2$,
$$c = \begin{cases} c_2, & \nexists c_1 : \text{states}(c_1) = \text{states}(c_2) \\ c_1, & \text{otherwise} \end{cases}$$
    finState($vnt \in$ Variant) := { ($wsId, s$) : ($s_{\text{pre}}, V, s_{\text{post}}) \in T$,
        ($wsId, T$) $\in vnt$, $\nexists (s_{\text{post}}, V, s_{\text{next}}) \in T$ }

PICKVARIANTS($vnts \subseteq$ Variant, $ss \in$ SimState, $goals \subseteq$ Goal) $\equiv$
  return $pickedVnts$ in
    $pickedVnts := \{ vnt \in vnts : \forall path \in vnt, wsId = id(path),$
      $F = \text{transs}(path), (s_{\text{pre}_1}, V_1, s_{\text{post}_1}) \in F, (wsId, s_{\text{pre}_1}) \in ss,$
      $(s_{\text{pre}_2}, V_2, s_{\text{post}_2}) \in F, (wsId, s_{\text{post}_2}) \in goal, goal \in goals$ }

Fig. 5B

VERIFYING(*vnts* ⊆ Variant, *vnt* ∈ Variant, *cr* ⊆ CopyRule, *ss* ∈ SimState,
    *allowedGoals* ⊆ Goal, *A* ⊆ VarAss) ≡ return (*fail*, *copyRules*) in
  step
    *oldss* := ∅
    *globalFail* := false
  step while *oldss* ≠ *ss* and not *globalFail* do
    step
      *oldss* := *ss*
      (*ss*, *options*) := NEXTNONDETOPTIONS(*vnts*, *vnt*, *cr*, *ss*)
    step if *oldss* ≠ *ss* then do forall *option* ∈ *options*
      step *optionVnts* := PICKVARIANTS(*vnts*, *option*, *allowedGoals*)
      step
        if *optionVnts* ≠ ∅ then
          step (*optionUncomposable*, *optionCopyRules*) :=
            REACHGOAL(*optionVnts*, *allowedGoals*, *option*, *allowedGoals*, *A*)
          step
            *copyRules* := *copyRules* ∪ *optionCopyRules*
            if *optionUncomposable* then *globalFail* := true
        else *globalFail* := true
  step
    if not *globalFail* and *ss* ∈ *allowedGoals* then *fail* := false
    else
      *fail* := true
      *copyRules* := ∅

NEXTNONDETOPTIONS(*vnts* ⊆ Variant, *vnt* ∈ Variant, *cr* ⊆ CopyRule,
    *ss* ∈ SimState) ≡ return (*ss*, *options*) in
  step *oldss* := ∅ par *options* := ∅
  step (*ss*, *options*) := FIREEXECUTES(*vnts*, *vnt*, *ss*, *cr*, ∅)   // start initiator
  step while *oldss* ≠ *ss* and *options* = ∅ do
    *oldss* := *sss*
    step *inputs* := FIRECOPYRULES(*ss*, *cr*)   // these should be deterministic
    step (*ss*, *options*) := FIREEXECUTES(*vnts*, *vnt*, *ss*, *cr*, *inputs*)

FIRECOPYRULES(*ss* ∈ SimState, *cr* ⊆ CopyRule) ≡ return *inputs* in
  *inputs* := { ($wsId_{in}$, $i$) : (($wsId_{out}$, $o$), ($wsId_{in}$, $i$))
    ∈ assignments(*copyRule*), *ss* = states(*copyRule*), *copyRule* ∈ *cr* }

Fig. 5C

FIREEXECUTES($vnts \subseteq$ Variant, $vnt \in$ Variant, $ss \in$ SimState,
    $cr \subseteq$ CopyRule, $inputs \subseteq$ Variable) $\equiv$ return ($ss$, $options$) in
step $ss := \{ (wsId, s) : (wsId, s_{ss}) \in ss, (wsId, T) \in vnt, t \in T,$
    $t = (s_{ss}, V, s_{post}),$
    $s = \begin{cases} s_{post}, & V \subseteq IN^{wsId}, \forall i \in V : (wsId, i) \in inputs \\ s_{ss}, & \text{otherwise} \end{cases} \}$
step
    $ndStates := \{ (wsId, S) : (wsId, s_{ss}) \in ss, (wsId, T) \in vnt,$
        $t_{vnt} \in T, t_{nd} \in ST^{wsId},$
        $t_{vnt} = (s_{ss}, O_{vnt}, s_{post_{vnt}}), t_{nd} = (s_{ss}, O_{nd}, s_{post_{nd}}),$
        $s_{post_{vnt}} \neq s_{post_{nd}}, s_{post_{nd}} \in S, O_{vnt}, O_{nd} \in OUT^{wsId} \}$
    $detStates := \{ (wsId, S) : (wsId, s_{ss}) \in ss, (wsId, T) \in vnt,$
        $t_{vnt} \in T, t_{vnt} = (s_{ss}, V_{vnt}, s_{post_{vnt}}),$
        $[ V_{vnt} \in IN^{wsId}, s_{ss} \in S ] \vee [ V_{vnt} \in OUT^{wsId}, \nexists t_{nd} \in ST^{wsId},$
        $t_{nd} = (s_{ss}, O_{nd}, s_{post_{nd}}), s_{post_{vnt}} \neq s_{post_{nd}}, s_{post_{vnt}} \in S ] \}$
step
    $options := \times_{(wsId, S) \in (ndStates \sqcup detStates)} [ \{wsId\} \times S ]$
    $ss := \{ (wsId, s) : (wsId, s_{ss}) \in ss, (wsId, T) \in vnt, t \in T,$
        $t = (s_{ss}, V, s_{post}), s = \begin{cases} s_{post}, & V \subseteq OUT^{wsId} \\ s_{ss}, & \text{otherwise} \end{cases} \}$

Fig. 5D

REACHVARIANT($vnt \in$ Variant, $g \in$ Goal, $A \subseteq$ VarAss) $\equiv$
   return $(fail, copyRules) \in$
     step
       oldps := $\emptyset$
       fail := false
       copyRules := $\emptyset$
       ps := { ($wsId, s, m$) $\in$ PlState : ($wsId, s$) $\in g$,
$$m = \begin{cases} OUT, & hasAdjacentOutTrans(wsId, s) \\ IN, & hasAdjacentInTrans(wsId, s) \\ undef, & s = s_{init}^{wsId} \end{cases}$$
       forall $wsId \in$ ids(ps) do outPool($wsId$) := { $o \in O$ : ($s_{pre}, O, s_{post}$)
          $\in Rules$, ($wsId, Rules$) $\in vnt$, $O \subseteq OUT^{wsId}$ }
     step while not fail and not done(ps) and not ps = oldps do
       oldps := ps
       step do forall $wsId \in$ ids(ps)
          adjInTrans($wsId$) := { ($s_{pre}, I, s_{post_1}$) $\in Rules$ :
             ($s_{post_1}, O, s_{post_2}$) $\in Rules$, $I \in IN^{wsId}$, ($wsId, Rules$) $\in vnt$,
             ($wsId, s_{post_2}, IN$) $\in$ ps $\vee$ ($wsId, s_{post_1}, IN$) $\in$ ps }
       step ($fail$, currAss) :=
          CALCINPUTSSERVED(ids(ps), $A$, adjInTrans, outPool)
       step if not fail then
          copyRules :=
             copyRules $\cup$ { CREATECOPYRULE(ps, currAss, adjInTrans) }
          step outPool := UPDATEOUTPOOLS($vnt$, ps, currAss, $A$, outPool)
          step ps :=
             CREATENEWPLANNINGSTATE($vnt$, ps, adjInTrans, outPool)
   where
     done($ps \in$ PlState) $\equiv \forall$ ($wsId, s, m$) $\in ps : s = s_{init}^{wsId} \vee$
       [ $\exists (s_{init}^{wsId}, V, s) \in ST^{wsId}$, $m = IN$, $V \subseteq OUT^{wsId}$ ]
     hasAdjacentOutTrans($wsId, s_{post}$) := $\exists (s_{pre}, O, s_{post}) \in ST_{out}^{wsId}$
     hasAdjacentInTrans($wsId, s_{post}$) := $\exists (s_{pre}, I, s_{post}) \in ST_{in}^{wsId}$

Fig. 5E

CALCINPUTSSERVED(*services* $\subseteq$ ID, $A \subseteq$ VarAss, adjInTrans, outPool) $\equiv$
   return (*fail*, currAss) in
      step currAss := { ( ( $wsId_{out}$, $o$ ), ( $wsId_{in}$, $i$ ) ) $\in A$ : $i \in I$,
          ( $s_{pre_{in}}$, $I$, $s_{post_{in}}$ ) $\in$ adjInTrans($wsId_{in}$), $o \in$ outPool($wsId_{out}$) }
      step
         if $\not\exists$ ( ( $wsId_{out_1}$, $o_1$ ), ( $wsId_{in_1}$, $i_1$ ) ) $\in A$ :
            ( ( $wsId_{out_2}$, $o_2$ ), ( $wsId_{in_1}$, $i_1$ ) ) $\in A$ :
            $wsId_{out_1} \neq wsId_{out_2} \lor o_1 \neq o_2$ then
            do forall $wsId_{in} \in$ *services*
                let *unservedVars* = { $i$ : ( $s_{pre}$, $I$, $s_{post}$ ) $\in$ adjInTrans($wsId_{in}$),
                   $i \in I$, ( ( $wsId_{out}$, $o$ ), ( $wsId_{in}$, $i$ ) ) $\notin$ currAss } in
                if *unservedVars* $\neq \emptyset$ then *fail* := true
        else *fail* := true CREATECOPYRULE(*ps* $\in$ PlState, *currAss* $\subseteq$ VarAss, adjInTrans) $\equiv$
   return (*states*, currAss) in
      let *states* = { ( $wsId$, $s$ ) $\in$ WSState : ( $wsId$, $s_{ps}$, $m$ ) $\in ps$,
          ([ adjInTrans($wsId$) = $\emptyset \land s = s_{ps}$ ]
          $\lor$ [ ( $s_{pre}$, $I$, $s_{post}$ ) $\in$ adjInTrans($wsId$) $\land s = s_{pre}$ ]) } in
      skip UPDATEOUTPOOLS(*vnt* $\in$ Variant, *ps* $\in$ PlState, *currAss* $\subseteq$ VarAss,
   $A \subseteq$ VarAss, outPool) $\equiv$ return outPool in
      do forall { ( $wsId_{out}$, $o$ ) : ( ( $wsId_{out}$, $o$ ), ( $wsId_{in}$, $i$ ) ) $\in$ currAss }
      let *futureUse* = { $i \in I$ : ( ( $wsId_{out}$, $o$ ), ( $wsId_{in}$, $i$ ) ) $\in A$, ( $s_{pre}$, $I$, $s_{post}$ )
          $\in$ *path*, *path* $\in$ CALCPATHS($T$, $s$), ( $wsId_{any}$, $T$ ) $\in vnt$,
          ( $wsId_{any}$, $s$, $m$ ) $\in ps$, ( ( $wsId_{out}$, $o$ ), ( $wsId_{in}$, $i$ ) )
          $\notin$ *currAss* } in
         if *futureUse* = $\emptyset$ then outPool($wsId_{out}$) := outPool($wsId_{out}$) \ { $o$ }

Fig. 5F

CREATENEWPLANNINGSTATE($vnt \in$ Variant, $ps \in$ PlState, adjInTrans, outPool) $\equiv$ return $newPs$ in
  step do forall $wsId \in \text{ids}(ps)$
    adjOutTrans($wsId$) := { ($s_{pre}$, $O$, $s_{post}$) $\in Rules$ : ($wsId$, $Rules$)
       $\in vnt$, ($wsId$, $s_{post}$, $OUT$) $\in ps$, $O \in OUT^{wsId}$ }
  step $newPs$ := { ($wsId$, $s$, $m$) : ($wsId$, $s_{ps}$, $m_{ps}$) $\in ps$, $$(s, m) = \begin{cases} (s_{ps}, IN) & : (s_{pre}, O, s_{post}) \in \text{adjOutTrans}(wsId), \\ & \quad O \cap \text{outPool}(wsId) = \emptyset \\ (s_{ps}, OUT) & : (s_{pre}, O, s_{post}) \in \text{adjOutTrans}(wsId), \\ & \quad O \cap \text{outPool}(wsId) \neq \emptyset \\ (s_{pre}, OUT) & : (s_{pre}, I, s_{post}) \in \text{adjInTrans}(wsId) \\ (s_{ps}, m_{ps}) & : \text{adjInTrans}(wsId) = \emptyset, \\ & \quad \text{adjOutTrans}(wsId) = \emptyset \end{cases}$$

INVOKEWEBSERVICE($wsId \in \text{ID}, I \subseteq \text{IN}^{wsId}$) ... native implementation RECEIVEDFROMWEBSERVICE($wsId \in \text{ID}, O \subseteq \text{OUT}^{wsId}$) ≡
   return $received \in \{ \text{true, false} \}$ in
     ... native implementation, returning truth value EXECUTE($wsId$) ≡ do forall $(s_{pre}, V, s_{post}) \in \text{ST}^{wsId}$
   if wsState($wsid$) = $s_{pre}$ and varState($wsId, v_1$) = initialized and ...
     and varState($wsId, v_{|V|}$) = initialized then
     wsState($wsId$) := $s_{post}$
where
   $v_x \in V, \ x = 1 .. |V|$ SEND($wsId$) ≡ do forall $\{ (I, s_{post}) : (s_{pre}, I, s_{post}) \in \text{ST}_{in}^{wsId} \}$
   if wsState($wsid$) = $s_{post}$ and varState($wsId, i_1$) = initialized and ...
     and varState($wsId, i_{|I|}$) = initialized then
     INVOKEWEBSERVICE($wsId, I$)
     do forall $i \in I$
        varState($wsId, i$) := processed
where
   $i_x \in I, \ x = 1 .. |I|$ RECEIVE($wsId$) ≡ do forall $\{ (s_{pre}, O) : (s_{pre}, O, s_{post}) \in \text{ST}_{out}^{wsId} \}$
   if wsState($wsid$) = $s_{pre}$ and RECEIVEDFROMWEBSERVICE($wsId, O$) then
     do forall $o \in O$
        varState($wsId, o$) := initialized
where
   $o_x \in O, \ x = 1 .. |O|$

Fig. 7A

COPY(*rules* ⊆ CopyRule) ≡ do forall ( *states*, *varAss* ) ∈ *rules*
   if wsState($wsId_1$) = $s_1$ and ... and wsState($wsId_{|states|}$) = $s_{|states|}$
      and varState($wsId_{out_1}$, $o_1$) = initialized and ...
      and varState($wsId_{out_{|varAss|}}$, $o_{|varAss|}$) = initialized
      and varState($wsId_{in_1}$, $i_1$) = undef and ...
      and varState($wsId_{in_{|varAss|}}$, $i_{|varAss|}$) = undef then
     do forall ( ( $wsId_{out}$, $o$ ), ( $wsId_{in}$, $i$ ) ) ∈ *varAss*
       varState($wsId_{in}$, $i$) := initialized
where
   ( $wsId_k$, $s_k$ ) ∈ *states*,    $k = 1$ .. $|states|$
   ( ( $wsId_{out_n}$, $o_n$ ), ( $wsId_{in_n}$, $i_n$ ) ),    $n = 1$ .. $|varAss|$ ORCHESTRATE(*cg* ∈ CompGoal, A ⊆ VarAss) ≡
   iterate choose { $M$ : $M$ ≡ SEND($wsId$) ∨ $M$ ≡ RECEIVE($wsId$)
      ∨ $M$ ≡ EXECUTE($wsId$) ∨ $M$ ≡ COPY(*rules*), $wsId$ ∈ ids(*cg*),
     *rules* = REACHCOMPGOAL(*cg*, A) }
   $M$

Fig. 7B

| No | Type | User | OldSchool | HeadQuarter | NewSchool |
|---|---|---|---|---|---|
| pq1 | primary | done | done | done | done |
| rq1 | recovery | init | init | init | init |
| rq2 | recovery | failed | init | init | init |
| rq3 | recovery | init | failed | init | init |
| rq4 | recovery | failed | failed | init | init |
| rq5 | recovery | init | cancelled | init | init |
| rq6 | recovery | failed | cancelled | init | init |
| rq7 | recovery | init | init | failed | init |
| rq8 | recovery | failed | init | failed | init |
| rq9 | recovery | init | failed | failed | init |
| rq10 | recovery | failed | failed | failed | init |
| rq11 | recovery | init | cancelled | failed | init |
| rq12 | recovery | failed | cancelled | failed | init |
| rq13 | recovery | init | init | cancelled | init |
| rq14 | recovery | failed | init | cancelled | init |
| rq15 | recovery | init | failed | cancelled | init |
| rq16 | recovery | failed | failed | cancelled | init |
| rq17 | recovery | init | cancelled | cancelled | init |
| rq18 | recovery | failed | cancelled | cancelled | init |
| rq19 | recovery | init | init | init | failed |
| rq20 | recovery | failed | init | init | failed |
| rq21 | recovery | init | failed | init | failed |
| rq22 | recovery | failed | failed | init | failed |
| rq23 | recovery | init | cancelled | init | failed |
| rq24 | recovery | failed | cancelled | init | failed |
| rq25 | recovery | init | init | failed | failed |
| rq26 | recovery | failed | init | failed | failed |
| rq27 | recovery | init | failed | failed | failed |
| rq28 | recovery | failed | failed | failed | failed |
| rq29 | recovery | init | cancelled | failed | failed |
| rq30 | recovery | failed | cancelled | failed | failed |
| rq31 | recovery | init | init | cancelled | failed |
| rq32 | recovery | failed | init | cancelled | failed |
| rq33 | recovery | init | failed | cancelled | failed |
| rq34 | recovery | failed | failed | cancelled | failed |
| rq35 | recovery | init | cancelled | cancelled | failed |
| rq36 | recovery | failed | cancelled | cancelled | failed |

Fig. 9

$copyRule_{pg_1} = (\ \{\ (U, requesting), (O, found), (H, found), (N, done)\ \},$
                $\{\ ((N, UpdRegInfo), (U, UpdRegInfo)),$
                  $((H, Customer), (O, StudID)),$
                  $((H, Customer), (O, SchoolID)),$
                  $((N, NewStudID), (H, NewStudID)),$
                  $((U, NewSchoolID), (H, NewSchoolID))\ \}\ )$ $copyRule_{ps_8} = (\ \{\ (U, requesting), (O, found), (H, found), (N, init)\ \},$
                $\{\ ((O, StudRegInfo), (N, StudRegInfo)),$
                  $((U, NewSchoolID), (N, NewSchoolID))\ \}\ )$ $copyRule_{ps_9} = (\ \{\ (U, requesting), (O, init), (H, found), (N, init)\ \},$
                $\{\ ((H, Customer), (O, StudID)),$
                  $((H, Customer), (O, SchoolID))\ \}\ )$ $copyRule_{ps_{10}} = (\ \{\ (U, requesting), (O, init), (H, init), (N, init)\ \},$
                 $\{\ ((U, CustID), (H, CustID))\ \}\ )$

— 380

$allowedGoal_1 = rg_8 = \{\ (U, failed), (O, init), (H, failed), (N, init)\ \}$
$allowedGoal_2 = rg_{10} = \{\ (U, failed), (O, failed), (H, failed), (N, init)\ \}$
$allowedGoal_3 = rg_{12} = \{\ (U, failed), (O, cancelled), (H, failed), (N, init)\ \}$
$allowedGoal_4 = rg_{26} = \{\ (U, failed), (O, init), (H, failed), (N, failed)\ \}$
$allowedGoal_5 = rg_{28} = \{\ (U, failed), (O, failed), (H, failed), (N, failed)\ \}$
$allowedGoal_6 = rg_{30} = \{\ (U, failed), (O, cancelled), (H, failed), (N, failed)\ \}$

— 382

$copyRule_{rg_8} = (\ \{\ (U, requesting), (O, init), (H, failed), (N, init)\ \},$
               $\{\ ((H, Fail), (U, Fail))\ \}\ )$ $copyRule_{ps_{12}} = (\ \{\ (U, requesting), (O, init), (H, init), (N, init)\ \},$
               $\{\ ((U, CustID), (H, CustID))\ \}\ )$

— 384

$allowedGoal_7 = rg_{16} = \{\ (U, failed), (O, failed), (H, cancelled), (N, init)\ \}$
$allowedGoal_8 = rg_{34} = \{\ (U, failed), (O, failed), (H, cancelled), (N, failed)\ \}$

— 386

370

Fig. 10A $copyRule_{rg_{16}} = (\ \{\ (U, requesting), (O, failed), (H, found), (N, init)\ \},$
$\qquad\qquad\quad \{\ ((O, Fail), (U, Fail))\ \}\ )$ $copyRule_{ps_{14}} = (\ \{\ (U, requesting), (O, init), (H, found), (N, init)\ \},$
$\qquad\qquad\quad \{\ ((H, Customer), (O, SchoolID)),$
$\qquad\qquad\qquad ((H, Customer), (O, StudID))\ \}\ )$ $copyRule_{ps_{15}} = (\ \{\ (U, requesting), (O, init), (H, init), (N, init)\ \},$
$\qquad\qquad\quad \{\ ((U, CustID), (H, CustID))\ \}\ )$

388

$allowedGoal_9 = rg_{36} = \{\ (U, failed), (O, cancelled), (H, cancelled), (N, failed)\ \}$

390

$copyRule_{rg_{36}} = (\ \{\ (U, requesting), (O, found), (H, found), (N, failed)\ \},$
$\qquad\qquad\quad \{\ ((N, Fail), (U, Fail))\ \}\ )$ $copyRule_{ps_{17}} = (\ \{\ (U, requesting), (O, found), (H, found), (N, init)\ \},$
$\qquad\qquad\quad \{\ ((O, StudRegInfo), (N, StudRegInfo)),$
$\qquad\qquad\qquad ((U, NewSchoolID), (N, NewSchoolID))\ \}\ )$ $copyRule_{ps_{18}} = (\ \{\ (U, requesting), (O, init), (H, found), (N, init)\ \},$
$\qquad\qquad\quad \{\ ((H, Customer), (O, SchoolID)),$
$\qquad\qquad\qquad ((H, Customer), (O, StudID))\ \}\ )$ $copyRule_{ps_{19}} = (\ \{\ (U, requesting), (O, init), (H, init), (N, init)\ \},$
$\qquad\qquad\quad \{\ ((U, CustID), (H, CustID))\ \}\ )$

```
execute User: requesting copy ps10: {HeadQuarter.CustomerID} :- initialized execute HeadQuarter: requested send HeadQuarter: {HeadQuarter.CustomerID} :- processed receive HeadQuarter: {HeadQuarter.Customer} :- initialized execute HeadQuarter: found copy ps9: {OldSchool.getStudRegDataSchoolID,
OldSchool.getStudRegDataStudentID} :- initialized execute OldSchool: requested send OldSchool: {OldSchool.getStudRegDataSchoolID,
OldSchool.getStudRegDataStudentID} :- processed receive OldSchool: {OldSchool.StudentRegistrationInfo} :-
initialized execute OldSchool: found copy ps8: {NewSchool.StudentRegistrationInfo,
NewSchool.NewSchoolID} :- initialized execute NewSchool: requested send NewSchool: {NewSchool.StudentRegistrationInfo,
NewSchool.NewSchoolID} :- processed receive NewSchool:
{NewSchool.UpdatedStudentRegistrationInfo} :-
initialized execute NewSchool: done copy pg1: {HeadQuarter.NewStudentID,
User.UpdatedStudentRegistrationInfo,
HeadQuarter.NewSchoolID, OldSchool.unregStudentStudentID,
OldSchool.unregStudentSchoolID} :- initialized execute User: done
execute HeadQuarter: done
execute OldSchool: done send User: {User.UpdatedStudentRegistrationInfo} :-
processed send HeadQuarter: {HeadQuarter.NewStudentID,
HeadQuarter.NewSchoolID} :- processed send OldSchool:
{OldSchool.unregStudentStudentID,
OldSchool.unregStudentSchoolID} :- processed
```

Fig. 11

COMPOSITION OF WEB SERVICES USING REPRESENTATIONS

TECHNICAL FIELD

Embodiments relate generally to the field of electronic data processing and more specifically to composition of Web services.

BACKGROUND

As a result of continuing technical progress, the processing and exchanging of electronic data has reached a high level. In order to provide new, more complex software programs, existing software programs may be used as components for a new software program. A Web service may be defined as a software program that is accessible via a communication infrastructure. The communication infrastructure may be, for example, the Internet or an intranet of an organization or a group of organizations. The communication infrastructure may allow for providing input data to a Web service and obtain output data from the Web service. In an example, a set of Web services may be used as an abstraction of a system interface of a company's information technology (IT).

A new Web service may be obtained by composing existing Web services. Composing existing Web services may include specifying an order in which different Web services are called and how data are exchanged between the different Web services.

Web services may be described in standard languages such as Web service description language (WSDL), semantic annotations for WSDL (SAWSDL), or Web service business process execution language (WSBPEL). A representation of a Web service may be defined as an object that allows for an identification of the Web service and that may be part of an environment that is different from the environment of the Web service. Therefore, a composition of representations of a group of Web services may be used to compose the Web services of the group.

BRIEF DESCRIPTION OF DRAWINGS

FIG. 4A is a list of definitions for an example implementation according to an embodiment.

FIG. 4B is a list of further definitions for an example implementation according to an embodiment.

FIG. 5A is a list of coding pieces of modules of an example implementation according to an embodiment.

FIG. 5B is a list of coding pieces of further modules of an example implementation according to an embodiment.

FIG. 5C is a list of coding pieces of further modules of an example implementation according to an embodiment.

FIG. 5D is a list of coding pieces of further modules of an example implementation according to an embodiment.

FIG. 5E is a list of coding pieces of further modules of an example implementation according to an embodiment.

FIG. 5F is a list of coding pieces of further modules of an example implementation according to an embodiment.

FIG. 5G is a list of coding pieces of further modules of an example implementation according to an embodiment.

FIG. 7A is a list of coding pieces of an example implementation of a Web service orchestration according to an embodiment.

FIG. 7B is a list of further coding pieces of an example implementation of a Web service orchestration according to an embodiment.

FIG. 9 is a table with goals related to four example Web service representations according to an embodiment.

FIG. 10A is a list of intermediate results related to a composition of four example Web service representations according to an embodiment.

FIG. 10B is a list of further intermediate results related to a composition of four example Web service representations according to an embodiment.

FIG. 11 is a list of orchestration statements related to an example execution of four example Web service representations according to an embodiment.

DETAILED DESCRIPTION

Embodiments may address how to compose Web services to obtain a composite Web service.

A system according to an embodiment may access a primary goal. The system may use representations of the Web service that are used as components, that is, representations of the component Web services. The primary goal may specify final states of the component Web services and may be identified with a successful execution of the composite Web service. The system may be able to provide one or more copy rules that describe a partially-ordered sequence of transitions from initial states of the representations of the component Web services to the primary goal.

The system may be efficient with respect to computation time and memory because, for example, one or more copy rules may be obtained by using a reduced number of combinations of states of the Web service representations. The reduced number may be smaller than the number of all possible combinations of states of the Web service representations. Furthermore, using representations of the component Web services allows for an efficient description of relevant characteristics of the Web services without a processing of data that is not required. Also, copy rules may describe sets of transitions in an efficient way using the representations of the component Web services. Furthermore, the representations of the component Web services, operations on the representations to obtain a composition result, and an orchestration of the Web services according to the composition result may be described in an identical framework.

A method according to a further embodiment may also use a primary goal and representations of the component Web services to obtain a copy rule. Accordingly, such a method may be efficient for the same reasons that the system may be efficient. The method may also be implemented using an identical framework for representations, operations, and orchestration.

A computer program product according to a further embodiment may share features of the system and accordingly the computer program product may also be efficient.

The following description of examples includes details for illustrating embodiments and is not intended to limit the scope of the embodiments or to be exhaustive. For purposes of explanation, specific details are set forth in order to provide a thorough understanding of example embodiments. A person skilled in the art may appreciate that further embodiments may be practiced with details that differ from the specific details.

Figure 1:
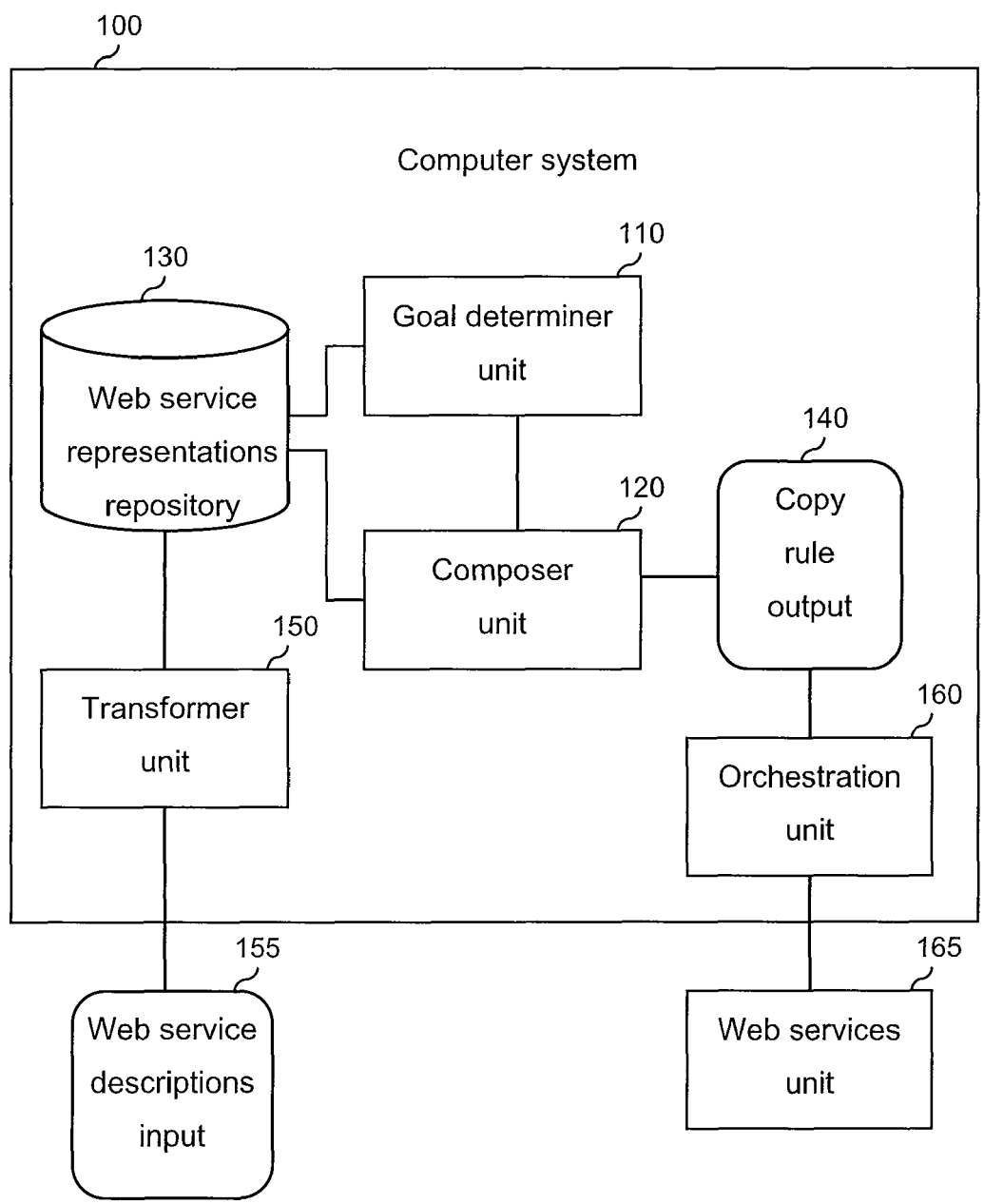
FIG. 1 is a block diagram of an example computer system according to an embodiment.

FIG. 1 is a block diagram of an example computer system 100 according to an embodiment. The computer system 100 is a system for composing Web services. The computer system 100 includes a goal determiner unit 110, a composer unit 120, a Web service representations repository 130, a copy rule output 140, a transformer unit 150, and an orchestration unit 160. Lines between elements of the diagram represent communicative couplings between the elements. The communicative coupling may be used to exchange data in either direction between the elements. Accordingly, the transformer unit 150 is coupled to a Web service description input 155 and the orchestration unit 160 is coupled to a Web services unit 165. In a further example, data may be transferred in a single direction from the Web service description input 155 to the transformer unit 150 and from the transformer unit 150 to the Web service representations repository 130.

The goal determiner unit 110 may be configured to access a primary goal that includes final states of Web service representations. A Web service representation may include states that represent states of a Web service, transitions between the states, and variables related to the transitions between the states. The variables related to the transitions between the states may be input variables and output variables.

The composer unit 120 may be configured to compute a set of transitions from initial states of the Web service representations to the primary goal. The set of transitions may identify a set of states of the Web service representations and the transitions between states. The set of transitions may be a variant including paths of each Web service representation. A path of a Web service representation may specify an ordered sequence of transitions or states the Web service representation goes through. Therefore, the set of transitions may specify the transitions or the states the Web service representations go through to change from the initial states of the Web service representations to the final states of the primary goal.

The composer unit 120 may be configured to compute intermediate states of one or more Web service representations. Each intermediate state may be related to a final state of the primary goal by a transition. The transition may consume one or more input variables. In an example, when a transition of a Web service representation to a final state gives an output variable an intermediate state may not be computed for the Web service representation. In an example, a composition may fail when an input variable of a transition of a Web service representation is not provided as output by a further Web service representation.

The composer unit 120 may be configured to generate a copy rule of the set of transitions. The copy rule may include a condition part and an activity part or update part. The condition part may specify the intermediate states of the Web service representations for which the intermediate states have been computed. The condition part may further specify final states of the primary goal of further Web service representations. In an example, the further Web service representations may be representations for which no intermediate states have been computed. The activity part may include one or more assignments of input variables consumed by transitions from the intermediate states to final states of the primary goal. Accordingly, a copy rule may identify or specify transitions through the assignments of input variables in the activity part. In an example, the assignments of the input variables may be assignments of the input variables to output variables provided by different transitions.

Transitions identified by a copy rule may be described as a unit because the transitions may be executed in one step when the states of the condition part are reached. A copy rule is an efficient way to describe transitions from pre-final states to the final states of the primary goal because the transitions may be grouped and executed in a single step.

In an example, one copy rule for the Web service representations may be sufficient to compose the Web services. This may be the case when the intermediate states specified by the one copy rule lead directly to an intermediate goal that is identical to the initial states of the Web service representations. In a further example, more than one copy rule may be generated to reach the initial states going backwards from the primary goal.

For this, the composer unit 120 may be configured to compute further intermediate states of one or more further Web service representations. The one or more further Web service representations may be partly identical to or completely different from the Web service representations for which the intermediate states have been computed for a previous copy rule. A further intermediate state may be related to a state of an intermediate goal by a further transition consuming further one or more input variables. The states of an intermediate goal may be related to states of the condition part of a generated copy rule by a transition when the transition is a provider transition.

The generated copy rule may be any one of the previous copy rules generated according to an embodiment. The generated copy rule may for example be the copy rule identifying the transitions from the intermediate states to the final states of the primary goal. The provider transition may be defined as a transition that provides one or more output variables to transitions identified by the activity part of the generated copy rule. The generated copy rule may be an immediately or directly previously generated copy rule. In an example in which the further copy rule is the second copy rule, the directly previously generated copy rule may be the copy rule identifying the transitions from the intermediate states to the final states of the primary goal. In an example, the provider transition may be required to provide all of the output variables related to the provider transition exclusively to one or more transitions of previously generated copy rules. Accordingly, a provider transition may be required to not provide an output variable to a transition that is not specified by an already generated copy rule. The states of the intermediate goal may be computed by requiring that the transitions from the states of the intermediate goal to the intermediate states are provider transitions.

In an example, the further intermediate states may be computed according to rules according to which also the intermediate states are computed. Such rules may be applied to states of the intermediate goal instead of states of the primary goal and therefore the rules give different results.

The composer unit 120 may be configured to generate a further copy rule of the set of transitions. The further copy rule may have a further condition part and a further activity part. The further condition part may specify the further intermediate states of the further one or more Web service representations and states of the intermediate goal of still further Web service representations. The still further Web service representations may be different from the further one or more Web service representations. The further activity part may include one or more assignments of further input variables consumed by further transitions from the further intermediate states to the states of the intermediate goal.

The composer unit 120 may be further configured to repeat to compute further intermediate states and generate further copy rules of the set of transitions. Such a repetition may continue as long as the states of an intermediate goal are different from the initial states of the Web service representations.

As a result, the generated one or more copy rules may provide a description of the set of transitions from the initial states of the Web service representations to the primary goal. Applying the one or more copy rules allows for a simulation of an execution of the Web services according to the set of transitions. However, in a real world execution of the Web services one or more of the Web services may execute a transition to a state that is not in accordance with the set of transitions to reach the primary goal. In an example, an orchestration of the Web services may take into account such a deviating behaviour of the one Web service. It may not be possible to reach the primary goal but a recovery goal may be reachable through a specific sequence of transitions of the Web services. Accordingly, the Web service representations and copy rules may be used to orchestrate the Web services when a deviating behaviour is encountered. A deviating behaviour represented by a deviation may also be encountered when going through transitions to reach a recovery goal. A deviating behaviour may be described as a non-deterministic behaviour of the Web service. A recovery goal may be identified with a set of final states that are acceptable from a workflow point of view.

For this, the composer unit 120 may be configured to simulate a partial execution of Web services according to the set of transitions by applying one or more copy rules to states of the Web service representations. Furthermore, a simulation of the partial execution may include one or more transitions that provide output variables. The states of the Web service representations may include the initial states of the Web service representations and states derived from the initial states according to copy rules.

The composer unit 120 may be configured to compute a transition to a deviation from the set of transitions. The deviation may be different from states of a condition part of a copy rule. Accordingly, the deviation may be a set of states that may not be reachable using the generated copy rules and provider transitions. In an example, the deviation may be identified with a simulated failure of a Web service.

For coping with the deviation, the goal determiner unit 110 may be configured to access a set of recovery goals that are obtainable from the deviation by a sequence of one or more recovery transitions. The set of recovery goals may be taken from a list of all acceptable recovery goals. Such a list may have been generated according to a simple rule or may have been manually created by a user. In an example, the primary goal may be defined by every Web service representation being in the state "done" and a simple rule may be that none of the Web service representations is in the state "done." The set of recovery goals may be provided to the composer unit 120.

The composer unit 120 may be configured to generate one or more recovery copy rules to cope with the deviation. For this, the one or more recovery copy rules may be configured to identify transitions through which a recovery goal of a set of recovery goals is obtainable. Each recovery copy rule may include a condition part specifying condition states of the Web service representations and an activity part including assignments of variables related to transitions from the states of the Web service representation. In an example, a recovery copy rule may have a structure that is identical to a copy rule related to the set of transitions.

Following a generation of the one or more recovery copy rules to cope with the deviation, a different deviation from the set of transitions may be considered.

For this, the composer unit 120 may be configured to simulate a further partial execution of the set of transitions by applying one or more further copy rules and one or more further transitions providing output variables to states obtained through the one or more copy rules.

The composer unit 120 may be configured to compute a transition to a further deviation from the set of transitions and to generate one or more further recovery copy rules. The one or more further recovery copy rules may be used to identify transitions through which a further recovery goal of the set of further recovery goals is obtainable. The set of further recovery goals may be provided by the goal determiner unit 110. Each one of the one or more further recovery copy rules may include a condition part specifying states and an activity part with assignments of variables.

The composer unit 120 may be configured to repeat to simulate further partial executions, compute transitions to further deviations from the set of transitions, and generate further recovery copy rules. Repetition may last until the primary goal is obtained through transitions identified by the copy rules of the set of transitions.

Accordingly, the goal determiner unit 110 may be configured to access the set of further recovery goals that are obtainable from the further deviation and to repeat to access sets of further recovery goals.

In an example, the composer unit 120 may be further configured to compute transitions to deviations from a recovery set of transitions to a recovery goal. For such a deviation from a recovery set of transitions a further recovery set of transitions may be generated to obtain a further recovery goal. This may be identified with a deviation from a deviation caused recovery. The goal determiner unit 110 may be configured to access the required set of recovery goals.

The computer system 100 may include as hardware a computer system such as a personal computer (PC), a server, a plurality of servers configured to execute software programs, or a mainframe computer system. The computer system 100 may include a client and a server related according to a client server architecture or may include one or more computers arranged in a peer-to-peer architecture or a distributed architecture. In a further example, the computer system 100 may include a plurality of individual computer systems that are connected by the Internet or by an intranet of an entity such as for example a company or an organization.

The hardware of the computer system 100 may run, for example, by hosting and executing, a software program that configures the computer system 100 to have characterizing features. Components or units of the computer system 100 may include software units that represent encapsulated or distributed instructions. Such software units may be executed by the hardware of the computer system 100 and execution may provide characterizing features of the units. Furthermore, units of the computer system 100 may include coding pieces that are organized in a way that is different from the units. In an example, coding pieces of one unit may be a part of different coding modules such as function modules or classes. In a further example, coding pieces of different units may be a part of an identical coding module. One or more units of the computer system 100 may be designed as Web applications.

The Web service representations repository 130 may include a memory component of the computer system 100, a hard disk drive, or a different kind of storage system configured to provide the Web service representations to the goal determiner unit 110 and the composer unit 120.

The transformer unit 150 may be configured to generate a Web service representation from a machine readable description of Web services. In an example, the description of the Web services may be in SAWSDL. In a further example, the description may be in a further description language such as WSDL. The transformer unit 150 may be able to obtain the descriptions of the Web services from the Web service description input 155 that may be for example a file, a message sent by a further computer system, or an access to stored data. The transformer unit 150 may identify properties of elements of a Web service and transform or map the properties to corresponding properties of elements of a Web service representation. The transformer unit 150 may then generate elements of the Web service representation according to the transformed or mapped properties. In an example, a state of a Web service may be transformed to a state of a Web service representation and a transition of a Web service may be transformed to a transition of a Web service representation.

The copy rule output 140 may include one or more copy rules that have been generated by the composer unit 120. The copy rule output 140 may be for example a file, a message, or a part of a memory component with the stored data including the one or more copy rules.

The orchestration unit 160 may be configured to execute a transition of one Web service representation when variables related to the transition of the one Web service representation are in a state "initialized." Such an execute operation may be implemented, for example, using a first abstract state machine.

The orchestration unit 160 may be configured to invoke a Web service represented by the one Web service representation. For this, the transition for the one Web service representation may be required to have been executed and each input variable related to an input transition of the specific Web service representation may be required to be in the state "initialized." Such an invoke operation may be implemented, for example, using a second abstract state machine.

The orchestration unit 160 may be configured to set each output variable related to an output transition of the one Web service representation to the state initialized. For this, each output variable may be required to have been received from the Web service represented by the specific Web service representation. Such a set operation may be implemented, for example, using a third abstract state machine.

A first, second, and third control abstract state machine (ASM) may be defined as parts of a representation of each Web service so that an orchestration of the Web service may be executed using the control ASM. The first, second, and third state machine may also be identified with control state machines that control the execution of the Web services used for the composition.

Figure 2A:
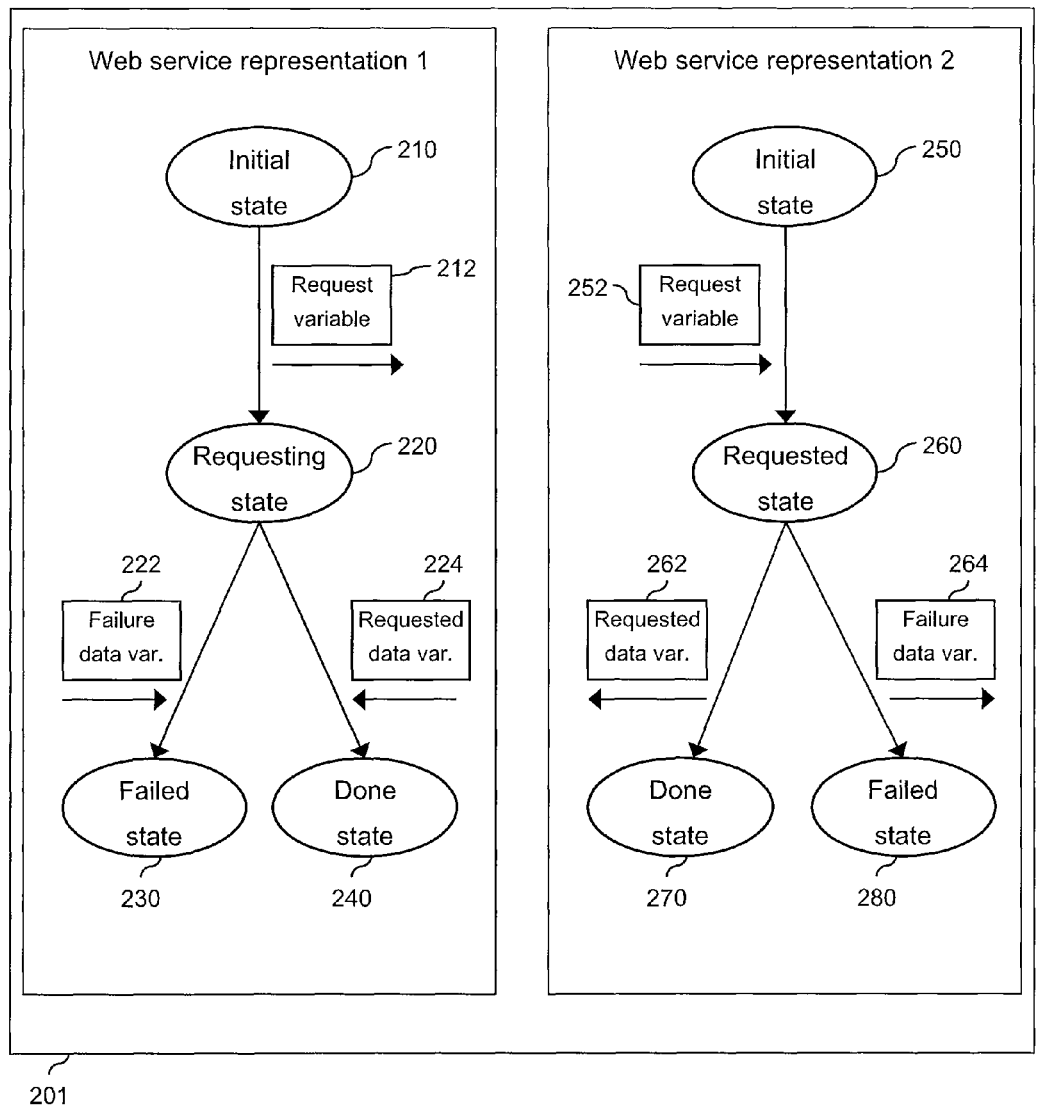
FIG. 2A is a diagram of two example Web service representations according to an embodiment.

FIG. 2A is a diagram of two example Web service representations 201 according to an embodiment. The Web service representation 1 includes an initial state 210, a requesting state 220, a transition from the initial state 210 to the requesting state 220, a request variable 212, a failed state 230, a transition from the requesting state 220 to the failed state 230, a failure data variable 222, a done state 240, a transition from the requesting state 220 to the done state 240, and a requested data variable 224. The Web service representation 2 includes an initial state 250, a requested state 260, a transition from the initial state 250 to the requested state 260, a request variable 252, a done state 270, a transition from the requested state 260 to the done state 270, a requested data variable 262, a failed state 280, a transition from the requested state 260 to the failed state 280, and a failure data variable 264.

Arrows between states represent transitions between the states. Arrows directed to a transition represent an input variable related to the transition and arrows directed from a transition represent an output variable related to the transition. As an example, the request variable 212 of Web service representation 1 is an output variable related to the transition between the initial state 210 and the requesting state 220. The request variable 252 of Web service representation 2 is an input variable related to the transition between the initial state 250 and the requested state 260.

In an example, the Web service representations 201 may be stored in the Web service representations repository 130 (see FIG. 1) to be accessed by the goal determiner unit 110 (see FIG. 1) or the composer unit 120 (see FIG. 1). In a further example, the Web service representations 201 may be stored in a further memory that is accessible by the goal determiner unit 110 or the composer unit 120.

During an execution of a Web service, a transition of the Web service providing one or more output variables may be observable and may be identified with a corresponding transition of the Web service representation. However, such a transition of the Web service may be non-deterministic because the Web service may for example fail and reach a different state. Such a different state may be observed and represented by a part of a deviation. Therefore, a transition of a Web service representation providing one or more output variables may depend on an observation. However, a transition consuming one or more input variables may be considered as reaching the end state of the transition when the one or more input variables are provided.

In an example, variables of the Web service representation 1 may be mapped to variables of the Web service representation 2. In a further example, such a mapping may not be required because an identity of the variables may be defined in a framework of the Web service representations 201.

In an example, the request variable 212 and accordingly the request variable 252 may include an identifier of a data record such as a key for a database table. The requested data variable 224 and accordingly the requested data variable 262 may include the data record. The failure data variable 222 and accordingly the failure data variable 264 may include an error code for failures such as record not found or database not accessible.

Figure 2B:
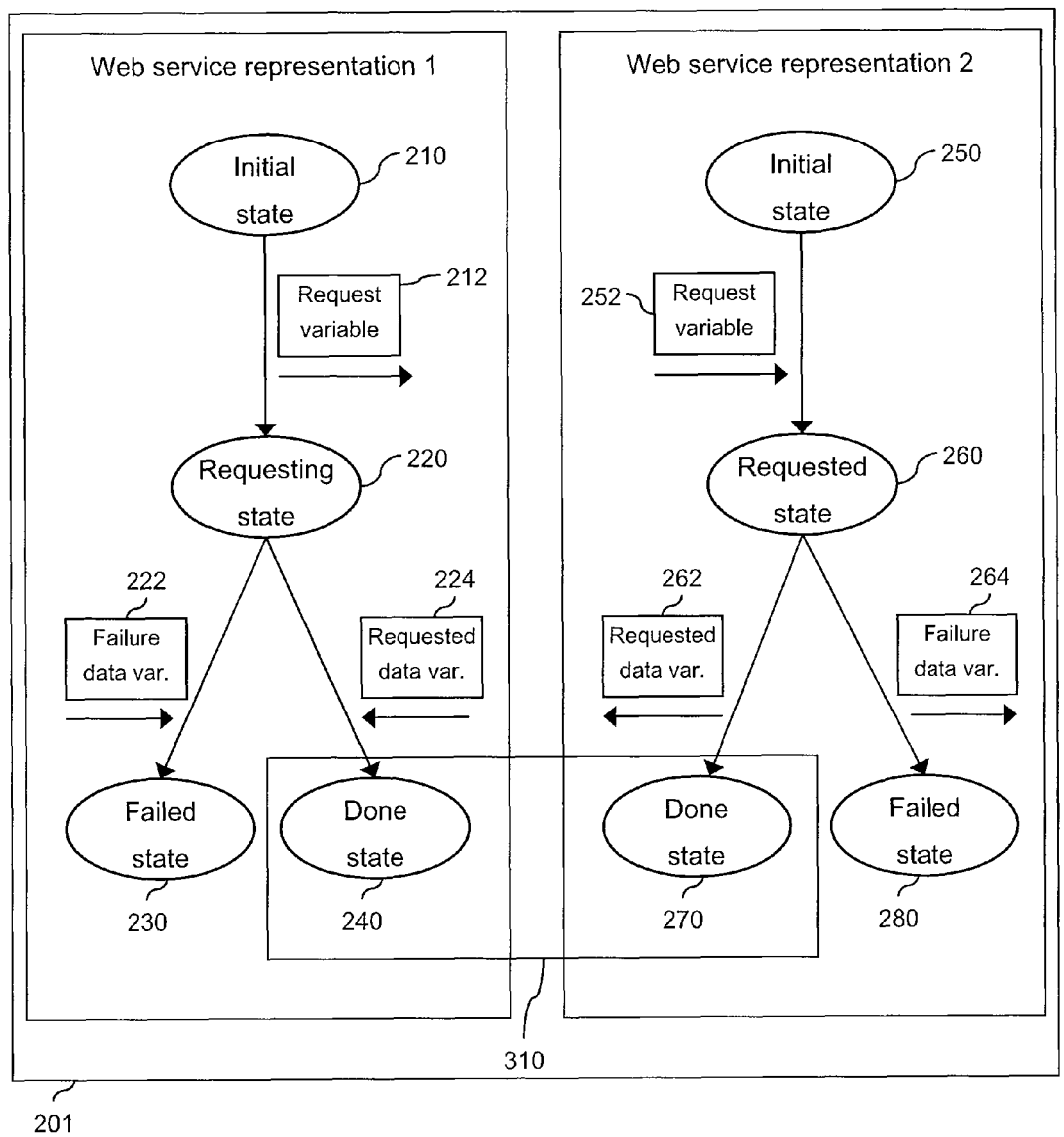
FIG. 2B is a diagram of the two example Web service representations and a specification of a primary goal.

FIG. 2B is a diagram of the two example Web service representations 201 and a specification of a primary goal 310. In the example, the primary goal includes the done state 240 of the Web service representation 1 and the done state 270 of the Web service representation 2. In a further example, more than one primary goal may be specified. In such a case, one of the primary goals may be selected or following operations may be executed for each primary goal separately. The primary goal may have been identified and entered by a user so that the goal determiner unit 110 may access the primary goal. The primary goal may have been computed by a module that identifies the primary goal for example with the done states of all Web service representations. The primary goal may have been saved in a memory to be accessed by the goal determiner unit 110.

Figure 2C:
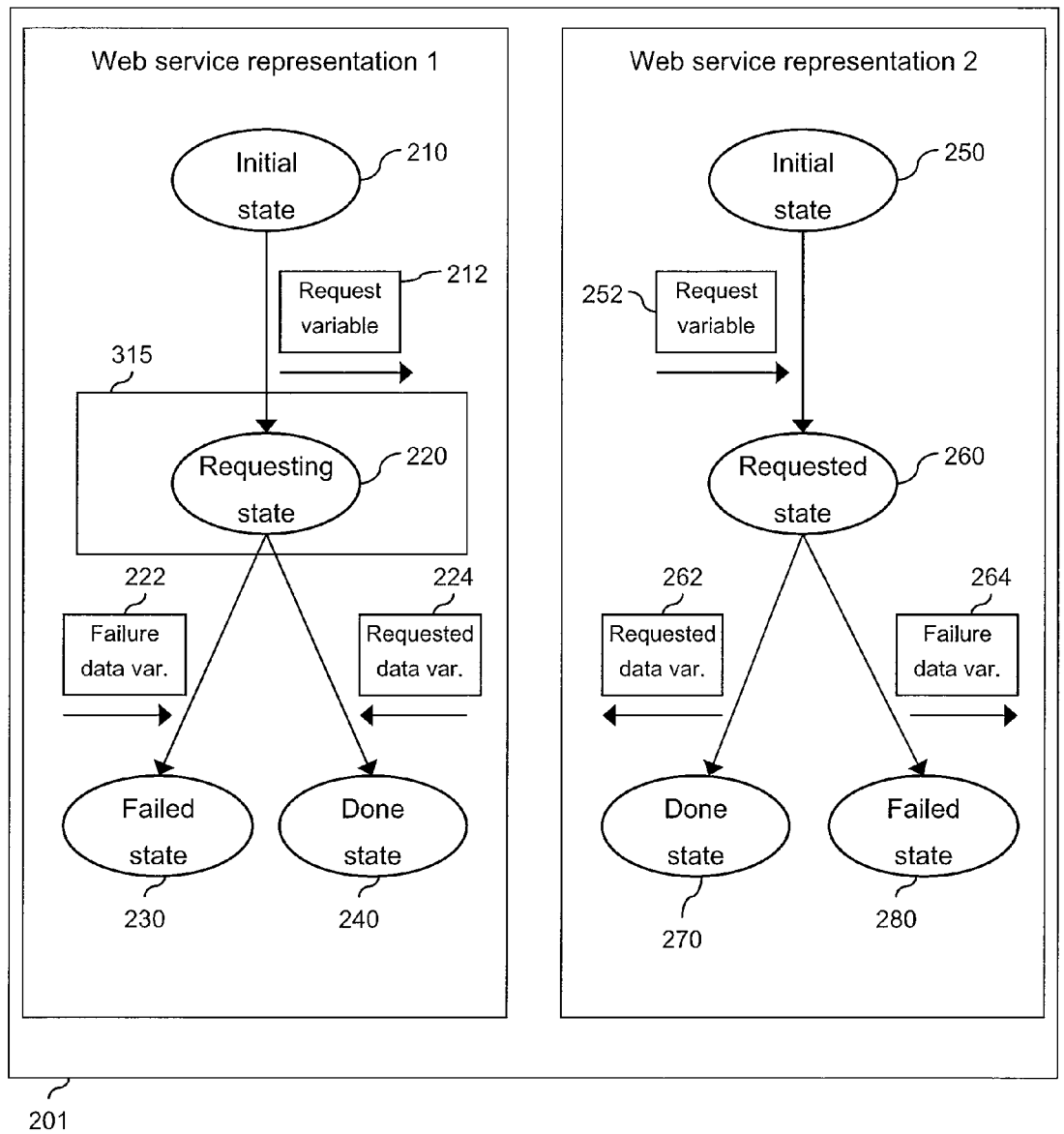
FIG. 2C is a diagram of the two example Web service representations and a specification of intermediate states.

FIG. 2C is a diagram of the two example Web service representations 201 and a specification of intermediate states 315. The intermediate states 315 have been computed according to an embodiment. In an example, the transition from the requesting state 220 to the done state 240 consumes an input variable. The input variable is the requested data variable 224 that is provided by a provider transition (see following figure) as the requested data variable 262. The provider transition is the transition from the requested state 260 to the done state 270. Provision of the requested data variable 224 takes into account a mapping between the requested data variable 224 and the requested data variable 262. Accordingly, the requesting state 220 of the Web service representation 1 is computed as one of the intermediate states 315. The done state 270 is not related to a prior state by a transition consuming one or more input variables. Accordingly, no intermediate state is computed for the Web service representation 2.

The intermediate states 315 and the done state 270 of the primary goal may be specified in a condition part of a first copy rule (e.g., as part of the copy rule output 140 of FIG. 1). The activity part of the first copy rule may include an assignment of the requested data variable 262 as an output variable to the requested data variable 224 as an input variable.

Figure 2D:
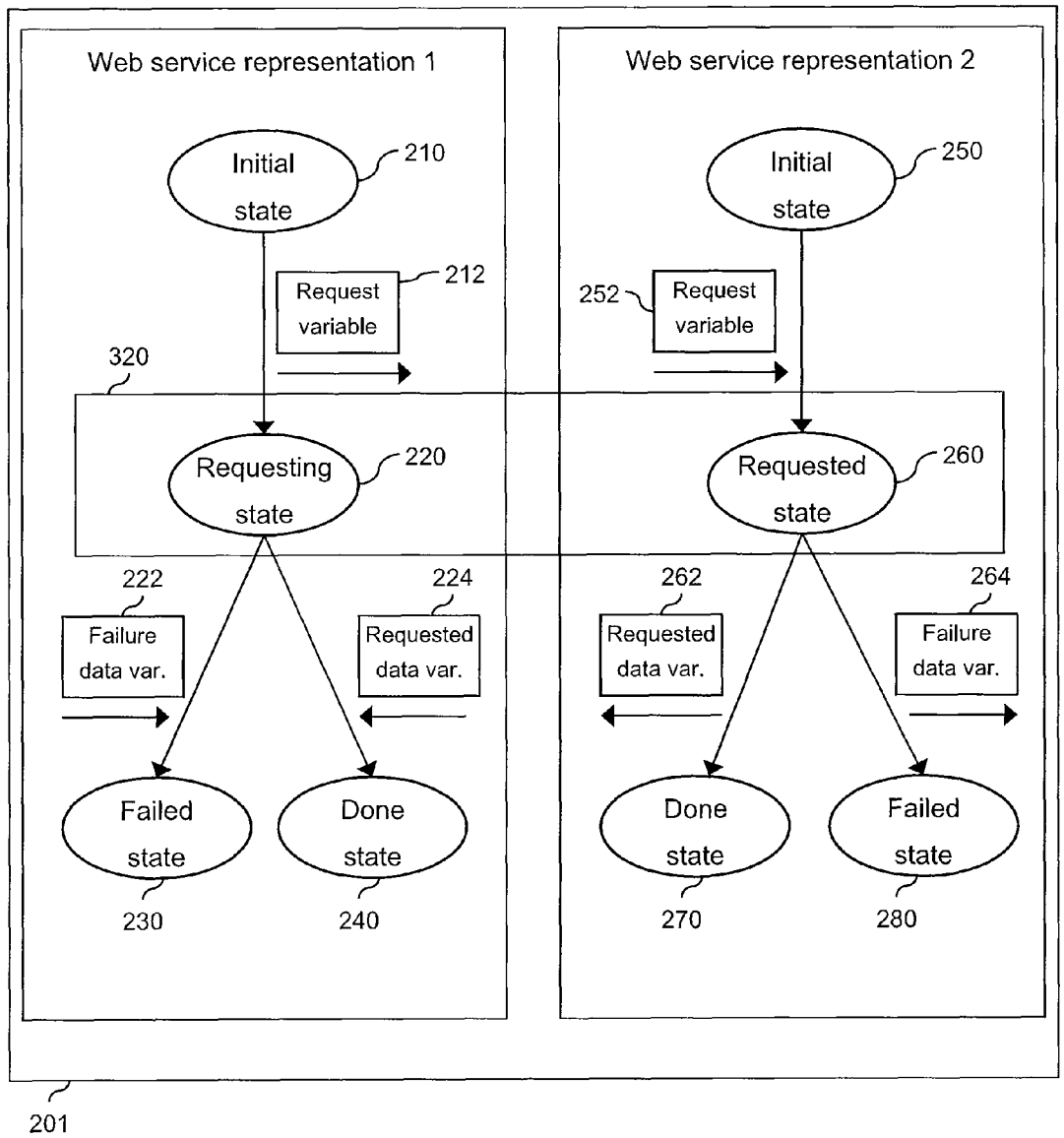
FIG. 2D is a diagram of the two example Web service representations and a specification of states of an intermediate goal.

FIG. 2D is a diagram of the two example Web service representations 201 and a specification of states 320 of an intermediate goal. In an example, the states 320 of an intermediate goal include the requested state 260 because the transition from the requested state 260 to the done state 270 is a provider transition. The provider transition provides the output variable requested data variable 262 to the transition identified by the activity part of the first copy rule, that is, the transition from the requesting state 220 to the done state 240. The requested data variable 262 is exclusively provided to the transition from the requesting state 220 to the done state 240. The transition from the requesting state 220 to the done state 240 is a transition to a final state of the primary goal and the requested data variable 262 is only provided to such a transition. Accordingly, the requested state 260 is computed as one of the states 320 of the intermediate goal. In a different example, the requested data variable 262 may also be an input variable of prior transition such as a transition from the initial state 210 to the requesting state 220. In such a case, the requested state 260 may not be computed as one of the states 320 of the intermediate goal. The requesting state 220 is not related to a provider transition. Accordingly, the state of the Web service representation 1 of the intermediate goal is identical to the state of the Web service representation 1 in the condition part of the first copy rule.

Figure 2E:
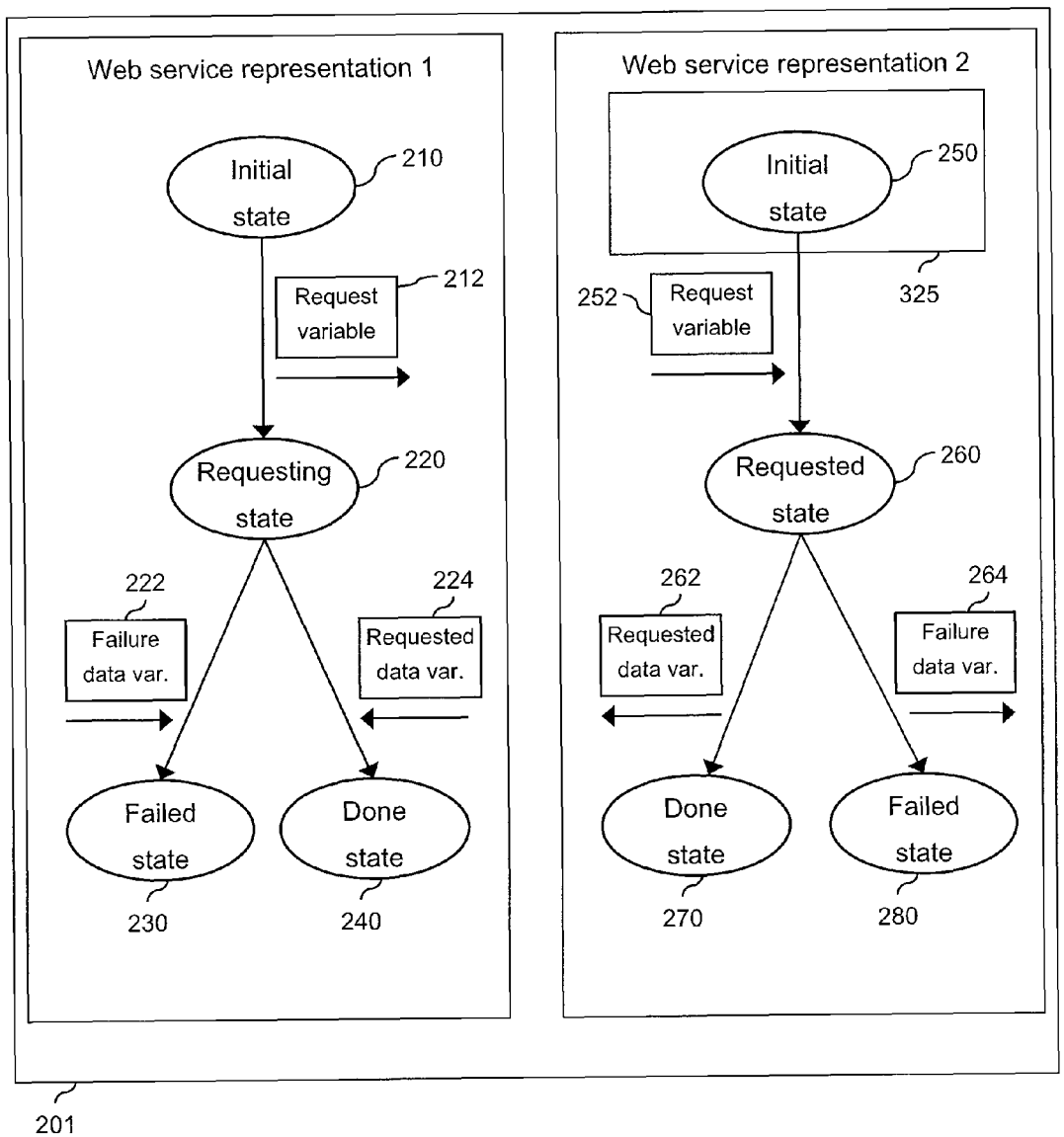
FIG. 2E is a diagram of the two example Web service representations and a specification of further intermediate states.

FIG. 2E is a diagram of the two example Web service representations 201 and a specification of further intermediate states 325. The further intermediate states 325 have been computed according to an embodiment. In an example, the transition from the initial state 250 to the requested state 260 has an input variable and is a provider transition. Provision of the input variable, that is, the request variable 252 takes into account a mapping between the request variable 252 and the request variable 212. Accordingly, the initial state 250 is computed as a further intermediate state.

The further intermediate states 325 and the requesting state 220 of the intermediate goal may be specified in condition part of a second copy rule. The activity part of the second copy rule may include an assignment of the request variable 212 as an output variable to the request variable 252 as an input variable.

Figure 2F:
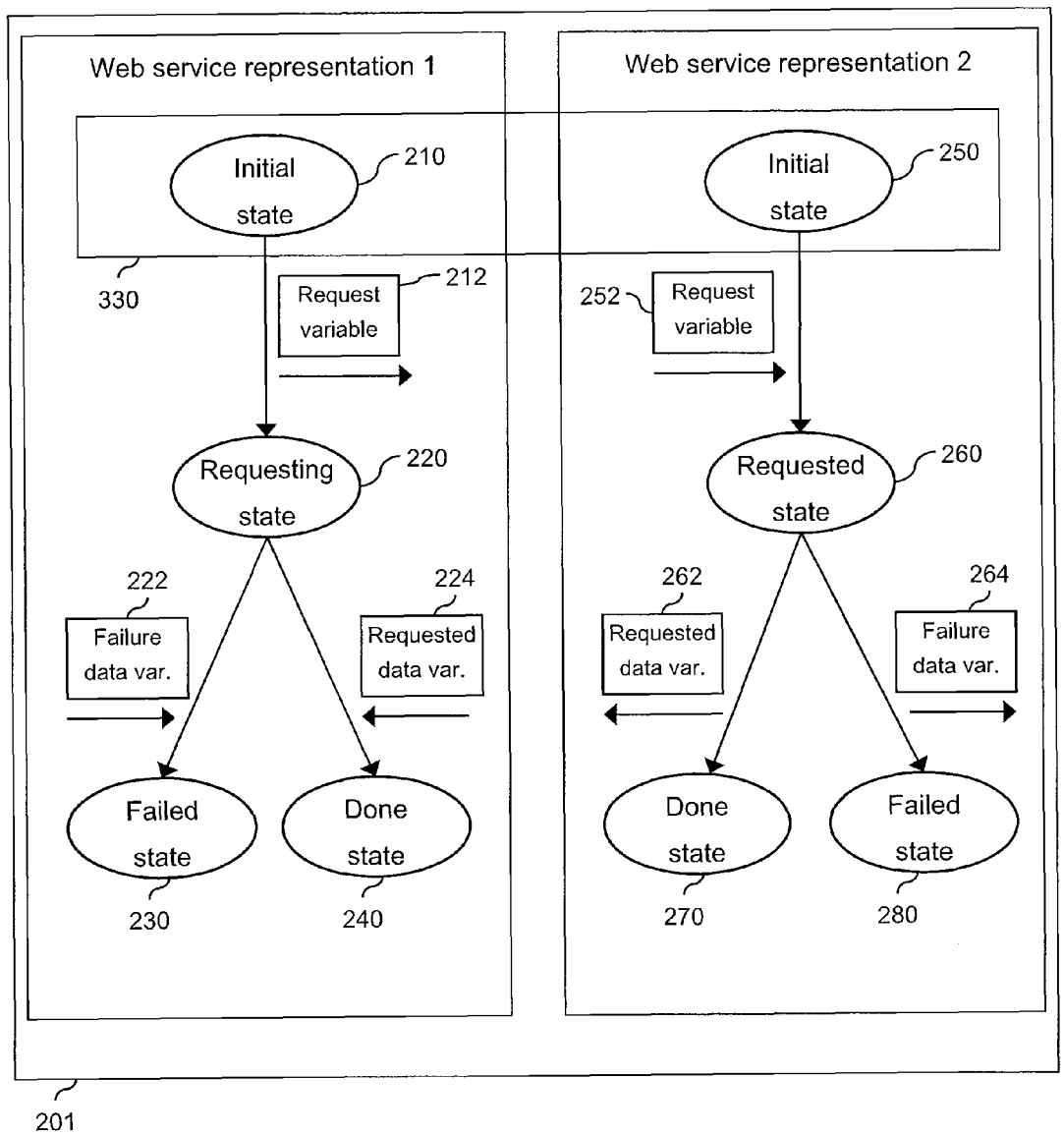
FIG. 2F is a diagram of the two example Web service representations and a specification of states of a further intermediate goal.

FIG. 2F is a diagram of the two example Web service representations 201 and a specification of states 330 of a further intermediate goal. In an example, the transition from the initial state 210 to the requesting state 220 has an output variable and is a provider transition. The request variable 212 is exclusively provided to the transition from the initial state 250 to the requested state 260. The transition from the initial state 250 to the requested state 260 is a transition identified by the activity part of a generated copy rule, that is, the second copy rule. Accordingly, the initial state 210 is computed as a further intermediate state. In a different example, the transition from the initial state 210 to the requesting state 220 may be a provider transition even when request variable 212 may also be provided to a transition that is identified by an activity part of a further copy rule, for example, the first copy rule.

The states 330 of a further intermediate goal are identical to the initial states of the Web service representations 201. Therefore, no further intermediate states may be computed and further copy rules may be generated. The complete set of transitions from the initial states to the primary goal may be described by first copy rule and the second copy rule and transitions with output variables, that is, the provider transitions.

Figure 2G:
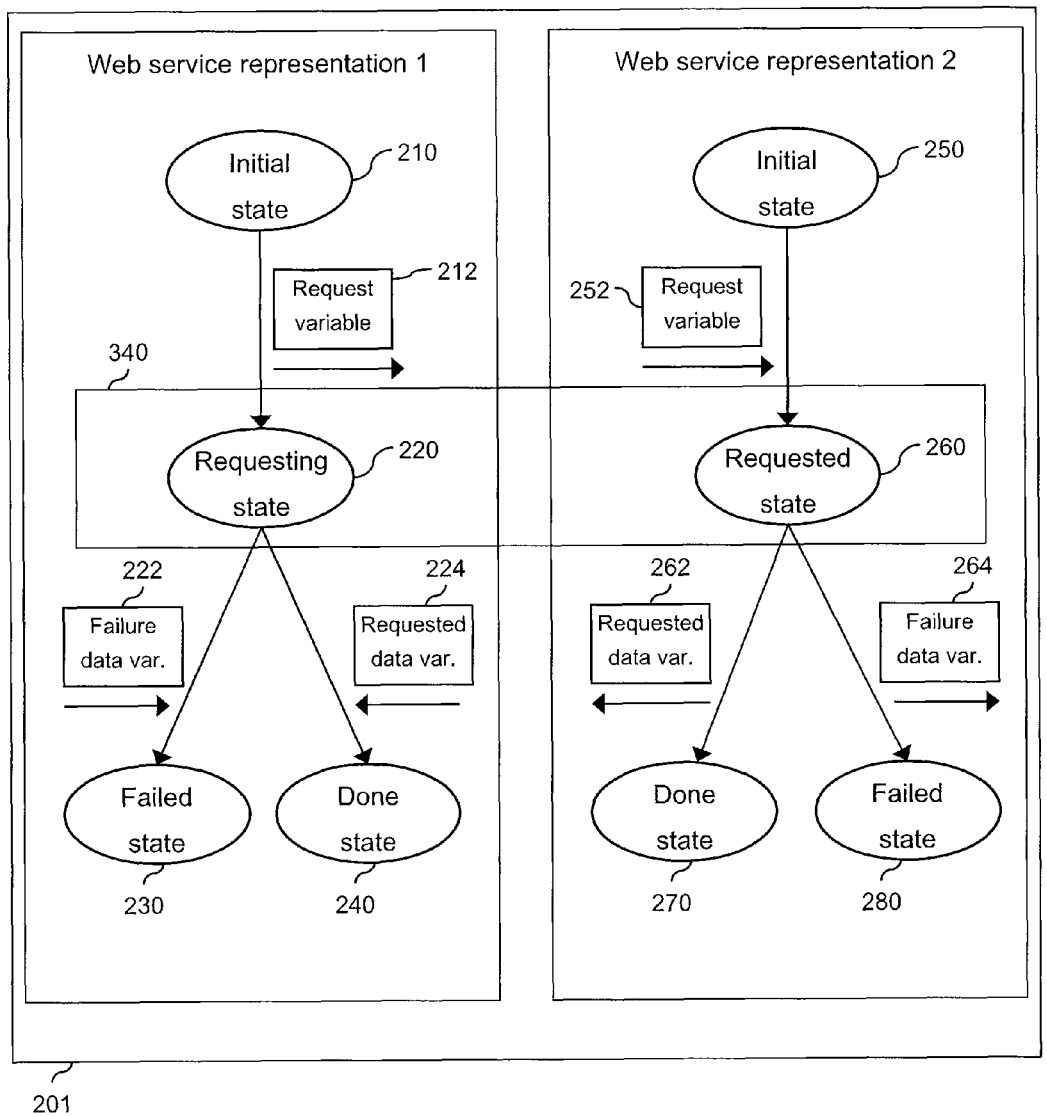
FIG. 2G is a diagram of the two example Web service representations and a specification of result states of a partial simulation.

FIG. 2G is a diagram of the two example Web service representations 201 and a specification of result states 340 of a partial simulation. The partial simulation may be identified with a simulation of a partial execution of the set of transitions to reach the primary goal or a recovery goal. According to an embodiment, the transition providing the output variable request variable 212 has been applied to the initial states. The condition part of the second copy rule specifies the initial state 250 and the requesting state 220 as a condition. Therefore, the second copy rule has been applied to the initial states to obtain the result states 340. The activity part of the second copy rule includes the assignment of the request variable 212 of the Web service representation 1 and the request variable 252 of the Web service representation 2. In this way, the activity part describes or identifies the transitions from the initial states to the result states 340.

Figure 2H:
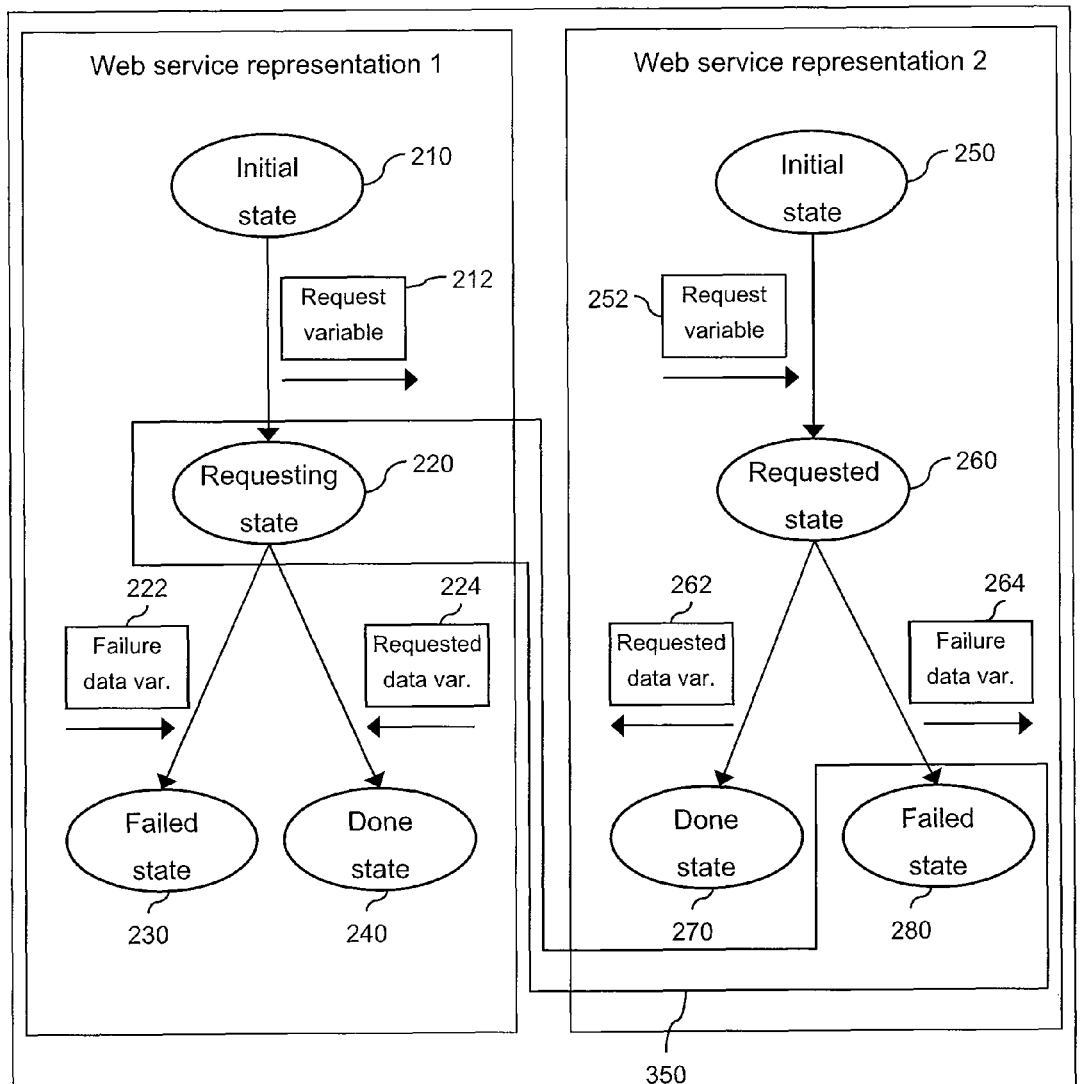
FIG. 2H is a diagram of the two example Web service representations and a specification of a deviation.

FIG. 2H is a diagram of the two example Web service representations 201 and a specification of a deviation 350. The deviation 350 includes the failed state 280 that is not specified in the condition part of the first copy rule. The deviation 350 may be obtained by applying a transition that is different from a provider transition used for specifying one of the intermediate goals. The deviation 350 may simulate a result of a failure of the Web service represented by the Web service representation 2.

Figure 2I:
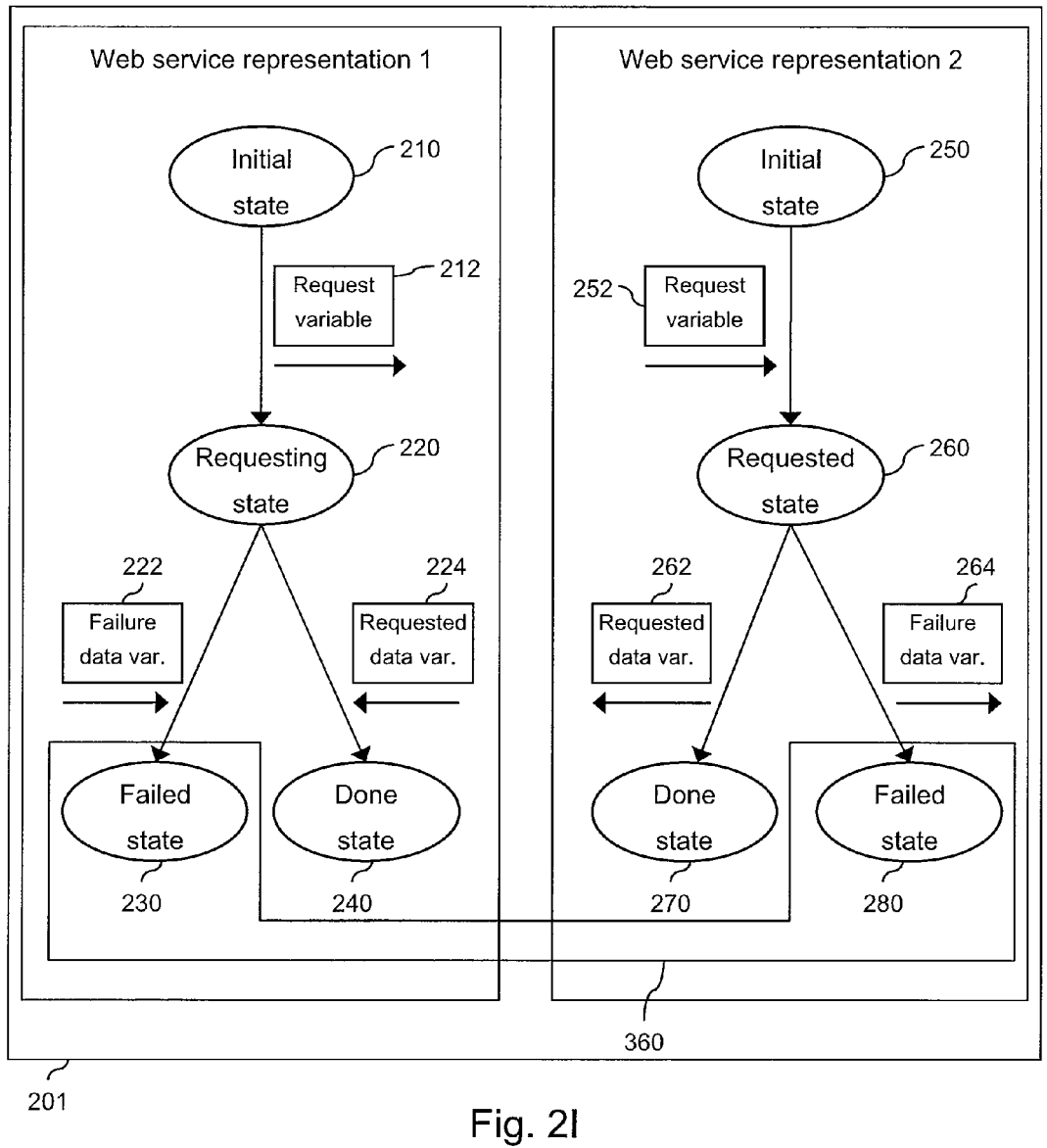
FIG. 2I is a diagram of the two example Web service representations and a specification of a recovery goal.

FIG. 2I is a diagram of the two example Web service representations 201 and a specification of a recovery goal 360. In an example, the recovery goal 360 may have been generated according to a rule stating that states of the one or more recovery goals are required to be individually different from the states of the primary goal. The generated one or more recovery goals may have been accessed by the goal determiner unit 110 (see FIG. 1) and reduced to the set of recovery goals that are obtainable from the deviation 350 (see FIG. 2H). The set of recovery goals may then be provided to the composer unit 120 (see FIG. 1). The composer unit 120 may generate the third copy rule that is a recovery copy rule to identify the transition to the failed state 230 given that the deviation 350 is fulfilled as a condition. In the example, one recovery copy rule is sufficient to reach the recovery goal.

Furthermore, no transitions to further deviations are computed so that the first copy rule, the second copy rule, and the third copy rule may be used to orchestrate the execution of the composite Web service including possible failures. Orchestration may include checking after each change of a state of a Web service if any one of the copy rules may be applied, that is, if the states after the change fulfill a condition part of any of the copy rules. In an example, an orchestration engine may check available machines including all control ASM if any of the available machines may be able to execute. The orchestration engine may then initiate an execution of such machines.

Figure 3:
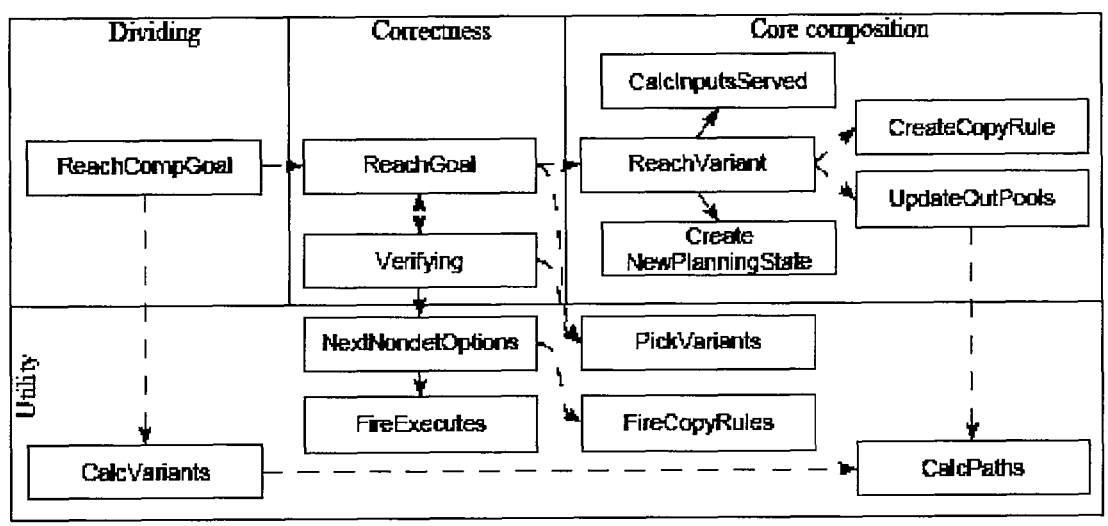
FIG. 3 is a block diagram of modules of an example implementation according to an embodiment.

FIG. 3 is a block diagram of modules of an example implementation according to an embodiment. The modules may represent an example implementation of the composer unit 120 that has been provided with composition goals by the goal determiner unit 110. The composition goals may include one or more primary goals and one or more recovery goals. In an example, each of the modules may be implemented as an ASM. Arrows between modules represent a dependency between the modules, meaning that the module from which an arrow starts calls the other module at which the arrow points.

The dividing part of the modules includes the module ReachCompGoal, the utility part includes the modules CalcVariants, CalcPaths, NextNondetOptions, FireExecutes, PickVariants, and FireCopyRules, the correctness part includes the modules ReachGoal and Verifying, and the core composition part includes the modules CalcInputsServed, ReachVariant, CreateNewPlanningState, CreateCopyRule, and UpdateOutPools.

FIG. 4A is a list of definitions for an example implementation according to an embodiment.

The list of definitions includes a definition of a repository, such as the repository 130 of FIG. 1, that may be configured to store the set of Web service representations to be composed. The repository may assign a unique ID to each Web service representation. A repository may include a single initiator. An initiator is a Web service representation whose first action is sending an output message.

The list includes a definition of a variable. Web service representations may communicate via a set of variables. In the example implementation, variables are local to Web service representations. Thus, the variables may be globally and uniquely referred to by stating the tuple of the Web service representation identifier and the local variable name.

The list includes a definition of a variable assignment (VarAss). Associations between the variables of different Web services may be variable assignments. A tuple may be used consisting of a Web service ID and the respective variables for the definition.

The list includes a definition of a Web service representation (WebService). The states of a Web service representation may be used to order its operations. The full definition of a Web service may include a state transition function (ST). A state transition may include a pre-state, a set of input variables (IN) or output variables (OUT), and a posterior state. A state transition may fully define a Web service operation in an example implementation. A Web service representation may have further following restrictions in an implementation: each input transition of a Web service representation may be required to be uniquely identifiable by the set of variables consumed; the state transitions of a Web service representation may be required to form a directed tree; the leave states of a Web service's state transition graph may be required to be final states; each state of a Web service representation transition graph may be required to have exactly one root which is an initial state ($s_{init}$); an input variable of a Web service representation may not be an output variable of the same Web service representation. Furthermore, the behavior of a Web service representation may not include a loop or a repeated execution of the Web service representation. In a further example, such restrictions may not be made.

The list includes a definition of a variable state (varState). Abstract state machines (ASM) may be used to orchestrate an execution of the Web services and machines of a Web service may communicate via specific states of its variables.

The list includes a definition of a composition goal (CompGoal), a set of primary goals (PrimGoal), a set of recovery goals (RecGoal), and a set of goals (Goal).

The list includes a definition of a state of a Web service representation (WSState) as a tuple.

The list includes a definition of a copy rule. Copy rules may fire at certain states of the Web service executions. The set of states of Web service representations specified by a copy rule may be understood as part of the copy rule's firing condition. In addition, a copy rule includes a set of variable assignments. The variable assignments may be interpreted as actions or activities to be executed upon a firing condition. In addition to a copy rule's firing condition and action a copy rule may be implemented so that the copy rule may not fire twice. For this, the firing condition may be enriched by a check whether all input variables of the variable assignments are still undefined (undef) and the activity may set the states to initialized.

FIG. 4B is a list of further definitions for an example implementation according to an embodiment.

The list includes a definition of a variant, that is, a set of transitions. A variant may be used to break down the composition problem into smaller pieces. The definition of these pieces may be based on the different potential execution paths through the state transitions of a single Web service representation in reaching final states. A variant may be identified with exactly one potential execution path of each participating Web service representation.

The list includes a definition of a planning state (PlState). The planning state may include a set where each member includes a component with a Web service state (WSState) and a mode (IN, OUT, undef). The Web service state component may include a Web service state directly behind an output transition.

The planning state referred to by such a representation may be a state of the Web service state component in the case of mode OUT and a directly preceding state in the case of mode IN. An exception may be made for the final state of a Web service representation. This may as well be the content of the Web service state component. The mode in this case may be OUT when the directly preceding transition is an output transition. The mode may be IN in case of a directly preceding input transition. Another exception may be when a Web service state component takes an initial state of a Web service representation ($s^{wsdl}_{init}$). In this case, the mode may be undef. A planning state for a Web service representation represented by a Web service state component and the mode component in the exception cases may be the exact state of the Web service state component.

FIG. 5A is a list of coding pieces of modules of an example implementation according to an embodiment. All modules of the example implementation may be implemented as abstract state machines (ASM).

The list includes a coding piece of module ReachCompGoal. One activity of ReachCompGoal is a calculation of all variants by calling a further module.

The list includes a coding piece of module CalcVariants. A variant may be computed by the module CalcVariants as a cross product (crossProduct) of all possible execution paths of the Web services involved in a goal (g) to reach g.

The list includes a coding piece of module CalcPaths. Possible execution paths to reach a specific state (s) of a Web service (wsId) may be computed according to this module. The paths location may include a set of paths where each path is a set of transition rules. In the beginning, a paths location may be initialized with exactly one path consisting of the one transition that directly leads to a specified state. Following this, transitions directly leading to an existing transition in a path in paths may be iteratively added to that path. The calculation may be performed as long as some paths grow. Therefore, the overall size of all paths (calcSumOfLengths) may be stored during a preceding iteration in oldSumOfLengths.

FIG. 5B is a list of coding pieces of further modules of an example implementation according to an embodiment.

The list includes a coding piece of module ReachGoal. ReachGoal is a module of the correctness part of the implementation and calls the modules Verifying, ReachVariant, and PickVariants. For one variant, the creation of copy rules may be achieved by the core composition algorithm (ReachVariant, see below). Copy rules created by ReachVariant ensure that a given goal may be reached in this variant. Due to potential non-deterministic behavior of the participating Web services, it may happen that an execution of the orchestration leaves one of the paths of a Web services representation along the variant, or even leave the path to a final state that is part of the defined goal. The result of such a composition may ensure that in such a case an alternative path is taken that leads to any other desired final state. This is ensured by a further module (Verifying).

An object of ReachGoal is to return copy rules ensuring a correct orchestration for at least one of the given goals considering the given variants (vnts). For this, it first may identify all variants (goalVnt) that lead to the goals (CalcVariants). Second, it may try to compose each of the variants (ReachVariant). This may result in some copy rules (regCopyRules). Third, the algorithm may create copy rules (altCopyRules) for each non-deterministic branch in a theoretic execution of regCopyRules (Verifying). The created copy rules may either provide a correct orchestration of that branch or Verifying may fail (altFail). When a correct orchestration is generated for finally at least one variant the corresponding copy rules (oneVariantCopyRules) may be returned.

The list includes a coding piece of module PickVariants. According to the example implementation, for further computations only variants (pickedVnts) may be considered out of the given variants (vnts) that pass the given state (ss) and lead to the given goal.

FIG. 5C is a list of coding pieces of further modules of an example implementation according to an embodiment.

The list includes a coding piece of module Verifying. Through ReachVariant in ReachGoal, a composition may be assured to be generated that steers an execution along a specific variant. However, this path of execution may depend on the non-deterministic behavior of other Web services that may cause a deviation from this path. For this case, Verifying may ensure that there exists a successful composition for each non-deterministically deviating path. The result of Verifying may be either a set of copy rules that ensures a successful composition or a notification of failure when no successful composition exists for all non-deterministic deviations. The verifying may terminate when a simulation stagnates (oldss=ss) or a generation of alternative copy rules fails (globalFail). Stagnation may happen when a simulation reaches an allowedGoal. In this case, the collected copyRules may be returned. In a further case of stagnation and in a case of failure, an empty set of copyRules may be returned with a failure notification (fail).

The list includes a coding piece of module NextNondetOptions. The NextNondetOptions module may perform a simulation of the current copy rules in order to determine the next non-determinism in an application on a real, collaborative Web service execution starting with simulation state (ss). This may be achieved by simulating the firing of all Execute machines of all Web services alternated with applying the copy rules (FireCopyRules, see a following module).

The list includes a coding piece of module FireCopyRules. When simulating an application of copy rules a task may be to identify the inputs that are served by the copy rules applicable in the current simulation state (ss).

FIG. 5D is a list of coding pieces of further modules of an example implementation according to an embodiment.

The list includes a coding piece of module FireExecutes. During a simulation, nondeterministic options may be identified with FireExecutes. First, a simulation state may be advanced for all input transitions with all inputs served. Second, all states (S in ndStates) may be examined for each Web service with non-deterministic branches that may be directly reached at a current state of simulation (ss) and that do not appear in transitions (T) of the current variant (vnt). Third, the states of the Web services may be collected without non-determinism (detStates). Fourth, all non-deterministic deviations may be calculated from the current variant (vnt) by creating a cross product of the states in ndStates and detStates. Finally, a simulation state (ss) may be calculated for each Web service that may be evaluated by a verification after the non-deterministic options were checked. A next state may be set to the directly following simulation state (spost) of the current variant (vnt) when no active transition alternatives directly follow the current simulation state. A transition may be active when the transition is an output transition and when the transition is an input transition and all of its input variables may be served.

FIG. 5E is a list of coding pieces of further modules of an example implementation according to an embodiment.

The list includes a coding piece of module ReachVariant. ReachVariant may be implemented as a module of the core composition algorithm (see FIG. 3). The composition algorithm may work iteratively from final states of the Web service representations to initial states of the Web service representations. Therefore, it may be required to keep track of the current state of the back chaining and thus introduce a planning state (PlState, see FIG. 4B).

The composition algorithm may take the following inputs: a variant of the possible Web service executions, for example, a specific execution path for each participating Web service; an initial planning state, derived from the given goal; and a set of possible variable assignments.

A general idea of the composition may be to create copy rules for matching outputs and inputs of different Web services representations in the current planning state (ps) and to add them to a set copyRules (CreateCopyRule). Following this, a planning state may proceed toward the initial states of the Web services (CreateNewPlanningState) and the algorithm may reiterate. The composition of a variant may be aborted if no valid composition may be achieved (fail), the planning state consists of only initial states (done), or the composition came to a dead end, for example, the planning state remained the same for two iterations. The latter case may occur when not all output variables of a service are consumed by further services. During a composition, such a Web service's planning state may not proceed any further toward its initial state.

For a creation of the copy rules in the current planning state some preliminary calculations may be performed. First, all output variables of all Web services representations that are available for this variant (outPool). Second, all input transitions of all Web services representations may be identified that directly lead to the current planning state (adjInTrans). For one Web service there may be exactly one such transition because the calculation bases on a variant. Third, all inputs of the identified input transitions may be matched with available outputs (CalcInputsServed). The correspondences for such a matching may be taken from the given, possible variable assignments (A). After creating the copy rules, the outPool locations may be updated in order to only contain all output variables that will be consumed at a later stage of the composition.

FIG. 5F is a list of coding pieces of further modules of an example implementation according to an embodiment.

The list includes a coding piece of module CalcInputsServed. CalcInputsServed may match input variables in adjInTrans and output variables in the different outPools. First, a subset of all possible variable assignments (A) may be built that may be assigned in the current planning state (currAss). Second, it may be checked whether all input transitions (adjInTrans) of all Web services representations may be served by the currAss. When this is not the case, the composition of this variant may have failed. This may be because the outPools may only shrink during the iterations of ReachVariant. Thus, input variables that may not be served right away may not be served at any time during composition.

The list includes a coding piece of module CreateCopyRule. A copy rule may include information about all variable assignments that are possible in a current planning state (ps). A first component of a copy rule may include the states of all involved Web services representations that may be a prerequisite for the copy rule to be applied in an execution. For this, it may be ensured that only states for involved Web services representations are collected. When a Web service representation acts as a source of a variable assignment, its state may be required to be the current planning state. This may be so because the Web service representations may be in a state following the output transition in order to have this output available during execution. When a Web service representations acts as a target of a variable assignment, its state may be required to be a state preceding the input transition served. A second component of the copy rule may include the current variable assignments currAss.

The list includes a coding piece of module UpdateOutPools. Output pools may be used to keep track of available output variables for the variable assignments and to determine whether each output variable has been assigned once to another Web service representation during composition. Therefore, an output variable may be removed from the output pool only if no Web service representation (wsId$_{any}$) relies on it in any of its input transitions (($s_{pre}$, I, $s_{post}$)) with respect to possible variable assignments (A) on the way back from the current planning state (s) to the initial state (path). Only when no output variable of an output rule appears in an output pool of a Web service representation, the planning state may be allowed to proceed over such an output transition rule.

FIG. 5G is a list of coding pieces of further modules of an example implementation according to an embodiment.

The list includes a coding piece of module CreateNewPlanningState. At the end of an iteration of ReachVariant, a new planning state may be calculated based on the current planning state (ps) as defined in CreateNewPlanningState. The following cases that correspond to alternatives for allocating variables may be distinguished: First, the planning state proceeds one step toward the initial state for a Web service representation in output mode with all outputs of its adjacent output transition not being members of its own outPool. This may be so because a Web service representation may be required to have reached the state after an output in order that the output may be accessed by a further Web service representation. Second, the planning state remains at the current planning state for a Web service representation in output mode with some of the outputs of its adjacent output transition being members of its own outPool. Third, the planning state proceeds one step toward the initial state for a Web service representation in input mode. Fourth, when the planning state for a Web service representation represents its initial state the planning state remains as it is.

Figure 6:
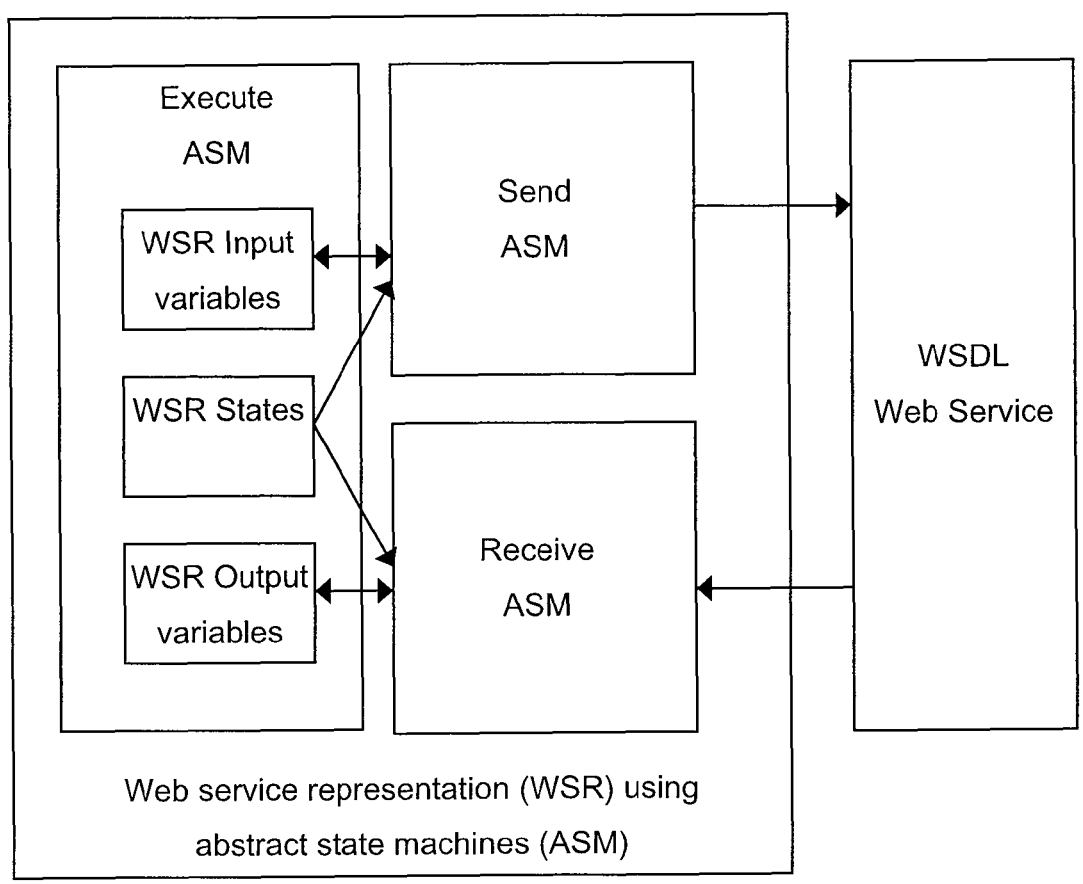
FIG. 6 is a block diagram of an example implementation of a Web service orchestration using abstract state machines according to an embodiment.

FIG. 6 is a block diagram of an example implementation of a Web service orchestration using abstract state machines (ASM) according to an embodiment. In an example, each Web service may be represented by three ASM: ASM Execute, ASM Send, and ASM Receive. A communication between a Web service and a Web service representation may include a set of operations. An operation may be an input or an output operation. In addition, each operation may communicate a defined set of variables. In an example, an operation call is represented by an arrow leading from ASM Send to a WSDL representation of Web service. A further operation call may be represented by an arrow leading from the WSDL representation of Web service to the ASM Receive. More specifically, an arrow leading from ASM Send may represent a further ASM InvokeWebService to call the input operation communicating the input variables I of Web service wsId. An arrow leading to ASM Receive may represent also a further ASM ReceivedFromWebService to return true if the Web service wsId has responded with the output operation communicating the output variables O.

InvokeWebServices and ReceivedFromWebService may provide a link between the real world represented by WSDL Web services and a model including the Web service representations. A Web service description in WSDL may also include a set of operations. Each operation may transport a set of parts. Each part may correspond to a variable of a Web service representation. In WSDL, operations may be of different type. One-way operations may include input only and may correspond to the input operation represented by InvokeWebServices. Notification operations may only include a single output and correspond to an output operation represented by ReceivedFromWebService.

There are at least two more operation types in WSDL that include an input, an output, and a fault in different orders. A request-response operation expects an input before it sends an output. Vice-versa, a solicit-response operation starts with an output to be understood as a request and expects an input as the answer afterward. Instead of the second message, a fault message may be communicated in both message types.

The composed Web services may be used to represent a business process. In an example, a business process may be a workflow that includes tasks connected via control flow information. In order to represent the control flow information, different operations may be linked to complex flows. For this purpose, the notion of state for Web service representations may be used. States of a Web service representation may be directly identifiable with states of a Web service description or with elements derived from a Web service description. States of Web service representations may be related according to a taxonomy of different types of states. A Web service representation may be required to include exactly one initial state and at least one successful, final state. In addition, a Web service representation may make use of arbitrarily many intermediary and other successful or unsuccessful final states.

The states of a Web service representation may be used to order operations of the Web service. Elements such as states of a Web service representation may be directly represented by corresponding elements of a Web service description.

By using states of a Web service representation operation types request-response and solicit-response of WSDL may be expressed. A request-response operation may be represented by a three state transition where the posterior state of the input operation equals the pre-state of the output and the fault operation. Correspondingly, a solicit-response operation may be represented by three state transitions where the posterior state of the output operation equals the pre-state of the input and the fault operation. In an example implementation, an extended version of SAWSDL may be utilized. In addition to the definitions possible with WSDL, SAWSDL may be used to further annotate the different components of a Web service description. An annotation may add the pre-state and posterior state information to each single message definition.

State transitions of a Web service representation may be identified with an execution of the Web service. For this, the three control state ASM Execute, Send, and Receive may be used. The machines of one Web service or one Web service representation may communicate via specific states of its variables. The variable states (varState) have been defined previously (see FIG. 4A). More specifically, for each Web service representation exactly one ASM (Execute) is defined that performs its state changes. The other ASM (Send and Receive) may trigger a state change of a Web service representation only indirectly by writing to input variables and by consuming output variables.

FIG. 7A is a list of coding pieces of an example implementation of a Web service orchestration according to an embodiment.

In example implementations the transformer unit 150 (see FIG. 1) may understand the elements of a Web service and how the elements are related to each other. For this, the elements may be described in a machine readable format. The transformer unit 150 may further use the element descriptions to generate a Web service representation for each Web service encountered and to generate elements for the Web service representations corresponding to the elements of the Web service.

The list includes an implementation of ASM InvokeWebService and an implementation of ASM ReceivedFromWebService. The ASM InvokeWebService may be called by the ASM Send and the ASM ReceivedFromWebService may be called by the ASM Receive.

The list includes an implementation of ASM Execute. The Execute machine may include a set of update rules changing the state of a Web service representation depending on its current state and the state of its variables. Whenever a service behavior contains a state transition whose prestate ($s_{pre}$) matches the current state (wsState) of the Web service representation and all variables ($v_1, v_2, \ldots, v_{|V|}$) communicated during this state transition have been initialized, then its state evolves to the posterior state ($s_{post}$).

The list includes an implementation of ASM Send. The SEND machine may observe the state of the assigned Web service representation and forwards input variables to the real Web service implementation represented by the Web service representation through InvokeWebService. This may happen under the condition that a Web service representation has passed an input state transition and all variables ($i_1, i_2, \ldots, i_{|I|}$) communicated during this state transition are still initialized. After invoking the Web service implementation, the variables communicated are marked as being processed. This may prevent the invocation from reoccurring.

The list includes an implementation of ASM Receive. The Receive machine may forward variables received from a real Web service implementation to a part of the Web service representation. The appropriate time for this is when a Web service execution stands right before an output state transition ($s_{pre}$) and the Web service implementation has produced the output already. The result of the receiving is that the variables communicated are marked as initialized. This may prevent the Receive machine from acting again and trigger the Receive machine.

FIG. 7B is a list of further coding pieces of an example implementation of a Web service orchestration according to an embodiment.

The list includes an implementation of ASM Copy. In addition to the contents of a copy rule's condition part and update or activity part provisions may take care that a copy rule may not fire twice. Therefore, the condition part may be enriched by a check whether all input variables of VarAss are still undefined (undef) and set their state to initialized in the rule's update part. This may trigger the Execute machine of the receiving Web service.

The list includes an implementation of ASM Orchestrate. Executing an orchestration may be implemented using ASM Orchestrate. This ASM may continuously invoke the Web service specific ASM such as Execute, Send, or Receive and the ASM COPY representing the copy rules in any order. The copy rules that are executed by the COPY machine may be defined by the ASM ReachCompGoal.

Figure 8:
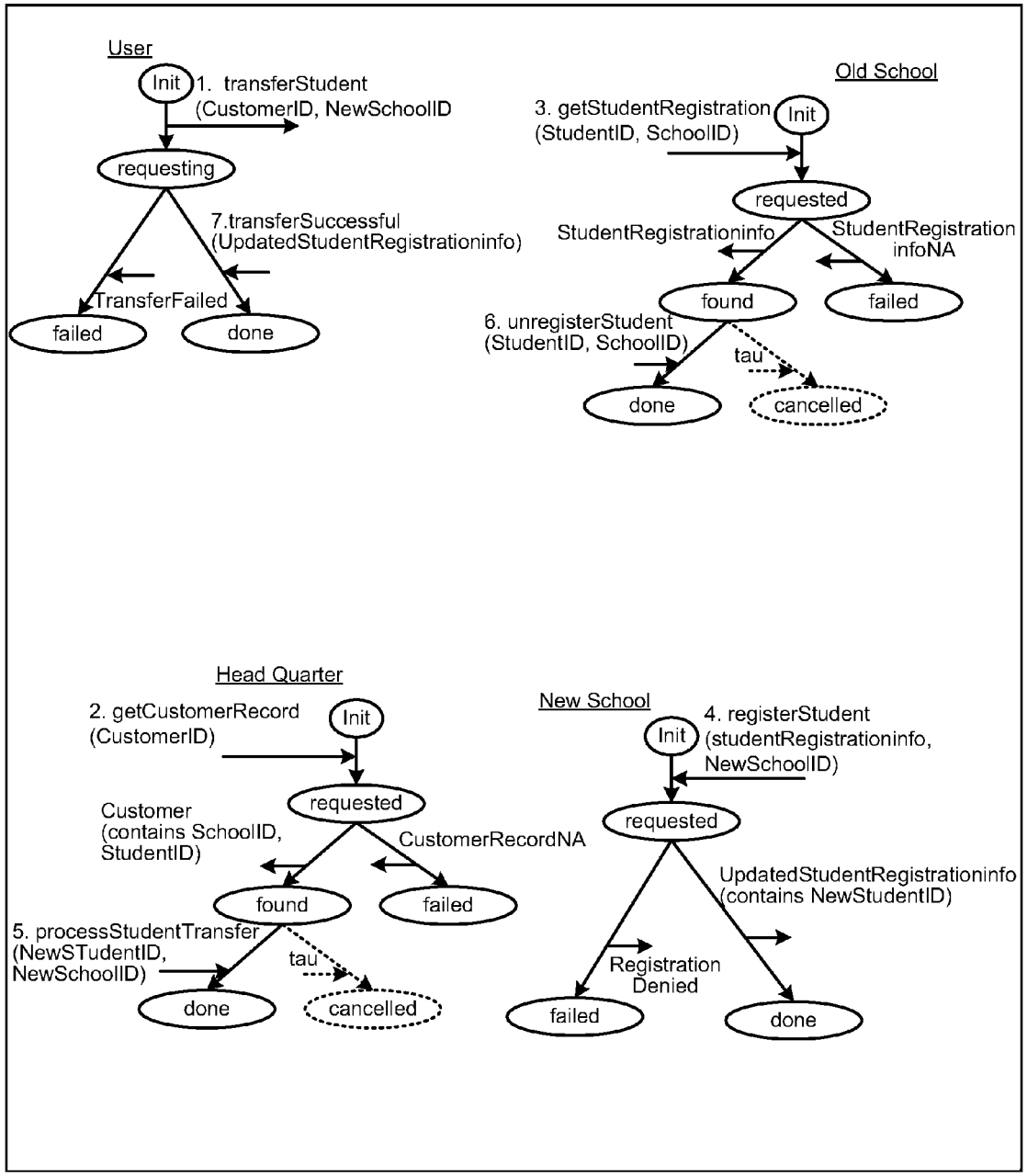
FIG. 8 is a diagram of four example Web service representations according to an embodiment.

FIG. 8 is a diagram of four example Web service representations according to an embodiment. States, transitions, input variables, and output variables are represented according to elements as described in prior Web service representations (see FIG. 2A). The four Web service representations, that is, User, OldSchool, HeadQuarter, and NewSchool may be stored in a repository, e.g., the repository 130 of FIG. 1.

FIG. 9 is a table with goals related to four example Web service representations according to an embodiment. An example aim of composing the four example Web service representations may be to create or generate a collaborative business process represented as an orchestration of the participating Web services. Goals may be used as properties a correct composition may be required to fulfill. A definition of correctness of a composition may be based on the states that all participating Web services can potentially reach in the end of the execution of the orchestration. Such a set of states may be defined as a Goal. A Goal may include a primary goal (PrimGoal) and a recovery goal (RecGoal). Both types of goals may be used to describe the requirements of a correct composition (CompGoal) (see FIG. 4A).

An orchestration may be defined as correct if and only if the orchestration has the following properties: each execution results in a system state that is part of the composition goal; a theoretic execution is required to lead to a system state defined as one of the primary goals. By such a definition, a transactionality of the Web services may be ensured. In an example, it may be possible to specify that either all Web services have to reach a successful state or no Web service may reach a successful state. For a student transfer example it may be unacceptable if the OldSchool successfully unregisters a student but the NewSchool fails in registering the student. In FIG. 9, an example primary goal pg1 and recovery goals rg1 to rg36 are specified for the Web services representations.

FIG. 10A is a list 370 of intermediate results related to a composition of four example Web service representations according to an embodiment.

Intermediate result 380 represents a set of copy rules that may lead the orchestration of the Web services represented by the four Web service representations to primary goal pg1 (see FIG. 9).

Intermediate result 382 represents allowed goals that are reachable from a first deviation or non-deterministic option. The first deviation has been identified following a simulation of an execution of the copy rule $copyRule_{ps10}$ according to intermediate result 310. The first deviation may be specified by the states {(U, requesting), (O, init), (H, failed), (N, init)}.

Intermediate result 384 represents a set of copy rules to reach allowed goal rg8 from the first deviation. According to an example, this may be the only reachable and allowed goal.

Intermediate result 386 represents allowed goals that are reachable from a second deviation specified by {(U, requesting), (O, failed), (H, found), (N, init)}.

FIG. 10B is a list 372 of further intermediate results related to a composition of four example Web service representations according to an embodiment.

Intermediate result 388 represents a set of copy rules to reach allowed goal $rg_{16}$ from the second deviation. In an example, $rg_{16}$ may be the only reachable and allowed goal.

Intermediate result 390 represents an allowed goal $rg_{36}$ that is reachable from a third deviation specified by {(U, requesting), (O, found), (H, found), (N, failed)}.

Intermediate result 392 represents a set of copy rules to reach the allowed goal $rg_{36}$ from the third deviation.

In the example, the implementation has ensured that the primary goal pg1 may be reached and there exist deterministic resolutions for each non-deterministic option or deviation to an allowed recovery goal. Therefore, the example may be specified as being successfully composable. The sets of copy rules include copy rules for reaching the primary goal and all non-deterministic options from the intended path.

FIG. 11 is a list of orchestration statements related to an example execution of four example Web service representations according to an embodiment.

Figure 12:
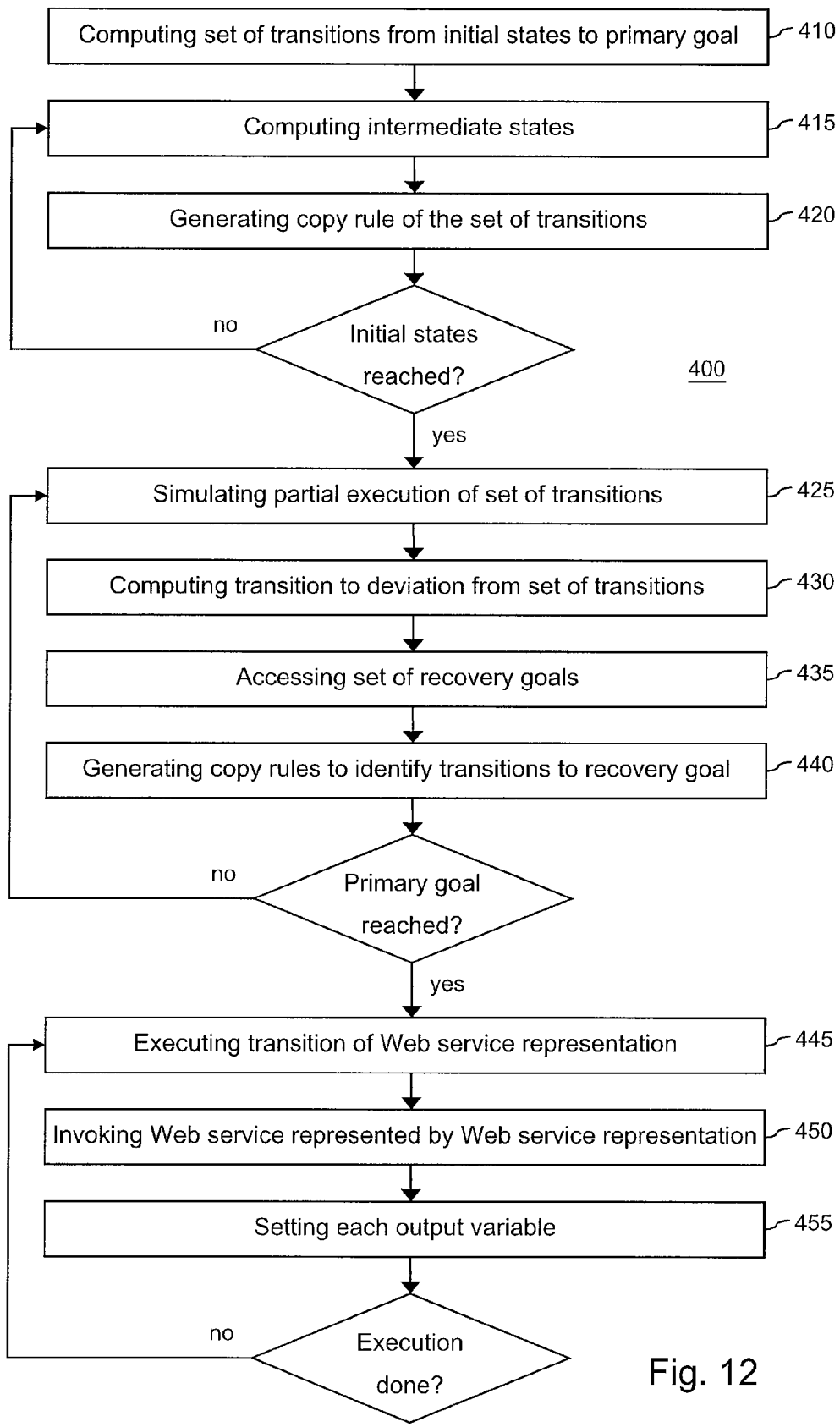
FIG. 12 is a flow diagram of an example method according to an embodiment.

FIG. 12 is a flow diagram of an example method 400 according to an embodiment. The method 400 may be for example a computer implemented method. Operations of the method 400 may be executed in a different order or with different conditions for repeating certain operations.

The method 400 includes computing 410 a set of transitions from initial states of Web service representations to a primary goal. Each Web service representation may include states, transitions between the states, and variables related to the transitions between the states. The primary goal may be final states of the Web service representations. In a further example, a different method may include generating the Web service representations from a machine readable description of the Web services prior to computing 410 the set of transitions.

The method 400 includes computing 415 intermediate states of one or more Web service representations. Each intermediate state may be related to a final state of the primary goal or to a state of an intermediate goal by a transition consuming one or more input variables. States of an intermediate goal may be related to states of a condition part of a previously generated copy rule by a transition when the transition is a provider transition. Further states of the intermediate goal for which such provider transitions may not be may be identical to further states of the condition part of the previously generated copy rule. The provider transition may be defined as a transition providing one or more output variables to transitions identified by the activity part of the previously generated copy rule. In an example, the output variables of a provider transition may not be provided to transition that is not identified by an activity part of any one of the so far generated copy rules.

The method 400 includes generating 420 a copy rule of the set of transitions. The copy rule may include a condition part and an activity part. The condition part may specify the intermediate states of the one or more Web service representations and states of the primary goal or of an intermediate goal of further Web service representations. The further Web service representations may be different from the one or more Web service representations. The activity part may include one or more assignments of input variables consumed by transitions from the intermediate states to states of the primary goal or of the intermediate goal.

The operations computing 410, computing 415, and generating 420 may be repeated for further intermediate states and further copy rules until the initial states of the Web service representations are reached. The initial states of the Web service representations may be reached when an intermediate goal is identical to the initial states. In an example, a composition to reach the primary goal may not be possible. In such a case, a composition to reach a recovery goal may be obtained.

The method 400 includes simulating 425 a partial execution of the set of transitions by applying one or more copy rules and one or more transitions providing output variables to the initial states and to states derived from the initial states.

The method 400 includes computing 430 a transition to a deviation from the set of transitions to reach the primary goal or a recovery goal. The deviation may be states at least one of which is different from states of a condition part of a copy rule. The deviation may be states that are not reachable by using transitions from the set of transitions.

The method 400 includes accessing 435 a set of recovery goals that may be obtainable from the deviation by a sequence of one or more recovery transitions.

The method 400 includes generating 440 one or more recovery copy rules to identify transitions through which a recovery goal of the set of recovery goals is obtainable. Each one of the one or more recovery copy rules may include a condition part specifying condition states of the Web service representations and an activity part including assignments of variables related to transitions from some of the condition states of the Web service representation.

The method 400 includes repeating operations simulating 425, computing 430, accessing 435, and generating 440 until the primary goal is obtained. The primary goal may be obtained through transitions identified by the copy rules of the set of transitions. Repeating may also be done for deviations from recovery transitions caused by deviations. In an example, one or more of the provider transitions that have been identified for generating the copy rules of the set of transitions may also be used for a simulation of the execution.

The method 400 includes executing 445 a transition of one Web service representation when variables related to the transition of the one Web service representation are in a state "initialized." Such an operation may be an operation at runtime of the composite Web service, that is, during an execution of the composite Web service. The runtime of the composite Web service may be different from a time when prior operations of the method 400 have been executed. The prior operations of the method 400 have been executed in order to compose the Web services and to obtain the composite Web service. Accordingly, following operations may also be executed during the runtime of the composite Web service.

The method 400 includes invoking 450 a Web service represented by the one Web service representation when the transition for the one Web service representation has been executed and when each input variable related to an input transition of the specific Web service representation is in the state initialized.

The method 400 includes setting 455 each output variable related to an output transition of the one Web service representation to the state initialized when each output variable has been received from the Web service represented by the specific Web service representation.

The method 400 includes repeating executing 445, invoking 450, and setting 455 until an execution of a composition of the Web service is done. In an example, this may be the case when the Web services reach final states that correspond to a primary goal of the Web service representations. In a further execution the final states of the Web services may be identical to states of a recovery goal of the Web service representations.

Executing 445 may be done by using a first abstract state machine, invoking 450 may be done by using a second abstract state machine, and setting 455 may be done by using a third abstract state machine.

Figure 13:
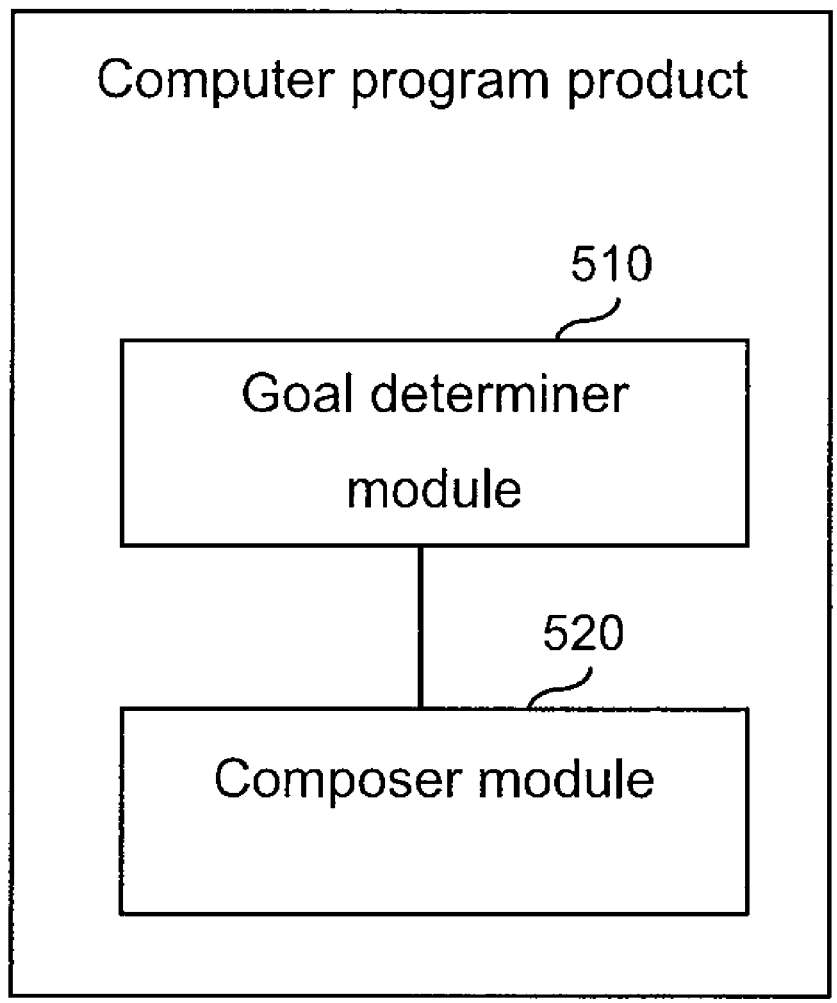
FIG. 13 is a block diagram of an example computer program product according to an embodiment.

FIG. 13 is a block diagram of an example computer program product 500 according to an embodiment. The computer program product 500 may have instructions that are executable by a computer system. The computer program product 500 may include instructions of a goal determiner module 510 and a composer module 520.

The goal determiner module 510 may be configured to access a primary goal. The primary goal may be final states of Web service representations. Each Web service representation includes states, transitions between the states, and input variables and output variables related to the transitions between the states.

The composer module 520 may be configured to compute a set of transitions from initial states of the Web service representations to the primary goal.

The composer module 520 may be configured to compute intermediate states of one or more Web service representations. Each intermediate state may be related to a final state of the primary goal by a transition consuming one or more input variables.

The composer module 520 may be configured to generate a copy rule of the set of transitions. The copy rule may include a condition part and an activity part. The condition part may specify the intermediate states of the one or more Web service representations and final states of the primary goal of further Web service representations. The activity part may include one or more assignments of input variables consumed by transitions from the intermediate states.

The goal determiner module 510 and the composer module 520 may have further features by having further instructions. The further features may be in accordance with features of the system 100 (see FIG. 1) or different systems according to embodiments.

As noted above, example embodiments may include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer-executable instructions into the executable format and a second computer may execute the transformed instructions. The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, hardware implementations, or equipment for receiving manual inputs.

The invention claimed is:

1. A system for composing Web services, the system comprising:
    a goal determiner unit configured to access a primary goal, the primary goal being final states of Web service representations, each Web service representation comprising states, transitions between the states, and variables related to the transitions between the states; and
    a composer unit configured to:
        compute a set of transitions from initial states of the Web service representations to the primary goal,
        compute intermediate states of one or more Web service representations, each intermediate state being related to a final state of the primary goal by a transition consuming one or more input variables, and
        generate a copy rule of the set of transitions, the copy rule comprising a condition part and an activity part, the condition part specifying the intermediate states of the one or more Web service representations and final states of the primary goal of further Web service representations and the activity part comprising one or more assignments of input variables consumed by transitions from the intermediate states.

2. The system of claim 1, the composer unit being further configured to:
    compute further intermediate states of further one or more Web service representations, each further intermediate state being related to a state of an intermediate goal by a further transition consuming further one or more input variables, states of the intermediate goal being related to states of the condition part of a generated copy rule by a transition when the transition is a provider transition and further states of the intermediate goal being identical to further states of the condition part of the generated copy rule, the provider transition providing one or more output variables to transitions identified by the activity part of the generated copy rule,
    generate a further copy rule of the set of transitions, the further copy rule comprising a further condition part and a further activity part, the further condition part specifying the further intermediate states of the further one or more Web service representations and states of the intermediate goal of still further Web service representations and the further activity part comprising one or more assignments of further input variables consumed by further transitions from the further intermediate states, and
    repeat to compute further intermediate states and generate further copy rules of the set of transitions when the states of an intermediate goal are different from the initial states of the Web service representations.

3. The system of claim 2, wherein
the composer unit is further configured to:
    simulate a partial execution of the set of transitions by applying one or more copy rules and one or more transitions providing output variables to the initial states of the Web service representations and to states derived from the initial states,
    compute a transition to a deviation from the set of transitions, the deviation being different from states of a condition part of a copy rule, and generate one or more recovery copy rules to identify transitions through which a recovery goal of a set of recovery goals is obtainable, each recovery copy rule comprising a condition part specifying condition states of the Web service representations and an activity part comprising assignments of variables consumed by transitions from one or more of the condition states of the Web service representation; and
the goal determiner unit is further configured to access the set of recovery goals that are obtainable from the deviation by a sequence of one or more recovery transitions.

4. The system of claim 3, wherein
the composer unit is further configured to:
    simulate a further partial execution of the set of transitions by applying one or more further copy rules and one or more further transitions providing output variables to further states of the Web service representations obtained through the one or more copy rules,
    compute a transition to a further deviation from the set of transitions, the further deviation being different from states of a condition part of a copy rule, and
    generate one or more further recovery copy rules to identify transitions through which a further recovery goal of a set of further recovery goals is obtainable, each one of the one or more further recovery copy rules comprising a condition part specifying further condition states of the Web service representations and an activity part comprising assignments of further input variables consumed by transitions from the one or more of the further condition states of the Web service representation; and
    repeat to simulate further partial executions, compute transitions to further deviations from the set of transitions, and generate further recovery copy rules until the primary goal is obtained through transitions identified by the copy rules of the set of transitions; and
the goal determiner unit is further configured to:
    access the set of further recovery goals that are obtainable from the further deviation by a sequence of one or more further recovery transitions, and
    repeat to access sets of further recovery goals.

5. The system of claim 1, further comprising a transformer unit configured to generate the Web service representations from a machine readable description of Web services.

6. The system of claim 1, further comprising an orchestration unit configured to: execute a transition of one Web service representation when variables related to the transition of the one Web service representation are in a state initialized;
invoke a Web service represented by the one Web service representation when the transition for the one Web service representation has been executed and when each input variable related to an input transition of the specific Web service representation is in the state initialized; and
set each output variable related to an output transition of the one Web service representation to the state initialized when each output variable has been received from the Web service represented by the specific Web service representation.

7. The system of claim 6, wherein the orchestration unit comprises for the one Web service representation:
a first abstract state machine configured to execute the transition of the one Web service representation, a second abstract state machine configured to invoke the Web service represented by the one Web service representation, and a third abstract state machine configured to set each output variable related to the output transition of the one Web service representation to the state initialized.

8. A method for composing Web services, the method comprising:
computing a set of transitions from initial states of Web service representations to a primary goal, each Web service representation comprising states, transitions between the states, and variables related to the transitions between the states, the primary goal being final states of the Web service representations;
computing intermediate states of one or more Web service representations, each intermediate state being related to a final state of the primary goal by a transition consuming one or more input variables; and
generating a copy rule of the set of transitions, the copy rule comprising a condition part and an activity part, the condition part specifying the intermediate states of the one or more Web service representations and final states of the primary goal of further Web service representations and the activity part comprising one or more assignments of input variables consumed by transitions from the intermediate states.

9. The method of claim 8, further comprising:
computing further intermediate states of further one or more Web service representations, each further intermediate state being related to a state of an intermediate goal by a further transition consuming further one or more input variables, states of the intermediate goal being related to states of the condition part of a generated copy rule by a transition when the transition is a provider transition and further states of the intermediate goal being identical to further states of the condition part of the generated copy rule, the provider transition providing one or more output variables to transitions identified by the activity part of the generated copy rule;
generating a further copy rule of the set of transitions, the further copy rule comprising a further condition part and a further activity part, the further condition part specifying the further intermediate states of the further one or more Web service representations and states of the intermediate goal of still further Web service representations and the further activity part comprising one or more assignments of further input variables consumed by further transitions from the further intermediate states; and
repeating computing further intermediate states and generating further copy rules of the set of transitions when the states of an intermediate goal are different from the initial states of the Web service representations.

10. The method of claim 9, further comprising:
simulating a partial execution of the set of transitions by applying one or more copy rules and one or more transitions providing output variables to the initial states of the Web service representations and to states derived from the initial states;
computing a transition to a deviation from the set of transitions, the deviation being different from states of a condition part of a copy rule;
accessing a set of recovery goals that are obtainable from the deviation by a sequence of one or more recovery transitions; and
generating one or more recovery copy rules to identify transitions through which a recovery goal of the set of recovery goals is obtainable, each recovery copy rule comprising a condition part specifying condition states of the Web service representations and an activity part comprising assignments of variables consumed by transitions from one or more of the condition states of the Web service representation.

11. The method of claim 10, further comprising:
simulating a further partial execution of the set of transitions by applying one or more further copy rules and one or more further transitions providing output variables to further states of the Web service representations obtained through the one or more copy rules;
computing a transition to a further deviation from the set of transitions, the further deviation being different from states of a condition part of a copy rule;
accessing a set of further recovery goals that are obtainable from the further deviation by a sequence of one or more further recovery transitions;
generating one or more further recovery copy rules to identify transitions through which a further recovery goal of the set of further recovery goals is obtainable, each one of the one or more further recovery copy rules comprising a condition part specifying further condition states of the Web service representations and an activity part comprising assignments of further input variables consumed by transitions from the one or more of the further condition states of the Web service representation; and
repeating simulating further partial executions, computing transitions to further deviations from the set of transitions, accessing sets of further recovery goals, and generating further recovery copy rules until the primary goal is obtained through transitions identified by the copy rules of the set of transitions.

12. The method of claim 8, further comprising generating the Web service representations from a machine readable description of the Web services.

13. The method of claim 8, further comprising:
executing a transition of one Web service representation when variables related to the transition of the one Web service representation are in a state initialized;
invoking a Web service represented by the one Web service representation when the transition for the one Web service representation has been executed and when each input variable related to an input transition of the specific Web service representation is in the state initialized; and
setting each output variable related to an output transition of the one Web service representation to the state initialized when each output variable has been received from the Web service represented by the specific Web service representation.

14. The method of claim 13, wherein: executing the transition of the one Web service representation uses a first abstract state machine, invoking the Web service represented by the one Web service representation uses a second abstract state machine, and setting each output variable related to the output transition of the one Web service representation to the state initialized uses a third abstract state machine.

15. A computer program product having instructions that are executable by a computer system, the computer program product comprising instructions of:
    a goal determiner module configured to access a primary goal, the primary goal including final states of Web service representations, each Web service representation comprising states, transitions between the states, and variables related to the transitions between the states; and
    a composer module configured to:
        compute a set of transitions from initial states of the Web service representations to the primary goal,
        compute intermediate states of one or more Web service representations, each intermediate state being related to a final state of the primary goal by a transition consuming one or more input variables, and
        generate a copy rule of the set of transitions, the copy rule comprising a condition part and an activity part, the condition part specifying the intermediate states of the one or more Web service representations and final states of the primary goal of further Web service representations and the activity part comprising one or more assignments of input variables consumed by transitions from the intermediate states.

16. The computer program product of claim 15, the composer module being further configured to:
    compute further intermediate states of further one or more Web service representations, each further intermediate state being related to a state of an intermediate goal by a further transition consuming further one or more input variables, states of the intermediate goal being related to states of the condition part of a generated copy rule by a transition when the transition is a provider transition and further states of the intermediate goal being identical to further states of the condition part of the generated copy rule, the provider transition providing one or more output variables to transitions identified by the activity part of the generated copy rule,
    generate a further copy rule of the set of transitions, the further copy rule comprising a further condition part and a further activity part, the further condition part specifying the further intermediate states of the further one or more Web service representations and states of the intermediate goal of still further Web service representations and the further activity part comprising one or more assignments of further input variables consumed by further transitions from the further intermediate states, and
    repeat to compute further intermediate states and generate further copy rules of the set of transitions when the states of an intermediate goal are different from the initial states of the Web service representations.

17. The computer program product of claim 16, wherein the composer module is further configured to:
    simulate a partial execution of the set of transitions by applying one or more copy rules and one or more transitions providing output variables to the initial states of the Web service representations and to states derived from the initial states,
    compute a transition to a deviation from the set of transitions, the deviation being different from states of a condition part of a copy rule, and
    generate one or more recovery copy rules to identify transitions through which a recovery goal of a set of recovery goals is obtainable, each recovery copy rule comprising a condition part specifying condition states of the Web service representations and an activity part comprising assignments of variables consumed by transitions from one or more of the condition states of the Web service representation; and
    the goal determiner module is further configured to:
        access the set of recovery goals that are obtainable from the deviation by a sequence of one or more recovery transitions.

18. The computer program product of claim 17, wherein the composer module is further configured to:
    simulate a further partial execution of the set of transitions by applying one or more further copy rules and one or more further transitions providing output variables to further states of the Web service representations obtained through the one or more copy rules,
    compute a transition to a further deviation from the set of transitions, the further deviation being different from states of a condition part of a copy rule, and
    generate one or more further recovery copy rules to identify transitions through which a further recovery goal of a set of further recovery goals is obtainable, each one of the one or more further recovery copy rules comprising a condition part specifying further condition states of the Web service representations and an activity part comprising assignments of further input variables consumed by transitions from the one or more of the further condition states of the Web service representation; and
    repeat to simulate further partial executions, compute transitions to further deviations from the set of transitions, and generate further recovery copy rules until the primary goal is obtained through transitions identified by the copy rules of the set of transitions; and
    the goal determiner module is further configured to:
        access the set of further recovery goals that are obtainable from the further deviation by a sequence of one or more further recovery transitions, and
    repeat, to access sets of further recovery goals.

19. The computer program product of claim 15, further comprising a transformer module configured to generate the Web service representations from a machine readable description of Web services.

20. The computer program product of claim 15, further comprising an orchestration module configured to:
    execute a transition of one Web service representation when variables related to the transition of the one Web service representation are in a state initialized;
    invoke a Web service represented by the one Web service representation when the transition for the one Web service representation has been executed and when each input variable related to an input transition of the specific Web service representation is in the state initialized; and
    set each output variable related to an output transition of the one Web service representation to the state initialized when each output variable has been received from the Web service represented by the specific Web service representation.

* * * * *